(12) United States Patent
Vogel et al.

(10) Patent No.: US 7,854,468 B2
(45) Date of Patent: Dec. 21, 2010

(54) SELF-DEPLOYING DRAG REDUCING DEVICE

(75) Inventors: John Vogel, Columbus, IN (US); Lee Telnack, Olympia, WA (US); James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 12/368,614

(22) Filed: Feb. 10, 2009

(65) Prior Publication Data

US 2009/0200834 A1 Aug. 13, 2009

Related U.S. Application Data

(60) Provisional application No. 61/065,490, filed on Feb. 12, 2008.

(51) Int. Cl.
B62D 35/00 (2006.01)
(52) U.S. Cl. ............... 296/180.1; 296/180.2; 296/180.4
(58) Field of Classification Search .............. 296/180.1, 296/180.2, 180.4, 181.5; 180/903
See application file for complete search history.

(56) References Cited

U.S. PATENT DOCUMENTS

| | | | |
|---|---|---|---|
| 4,006,932 A | 2/1977 | McDonald | |
| 4,320,920 A | 3/1982 | Goudey | |
| 4,601,508 A | 7/1986 | Kerian | |
| 4,693,508 A | 9/1987 | Pettit | |
| 4,978,162 A | 12/1990 | Labbe | |
| 5,171,057 A | 12/1992 | Sharp | |
| 5,498,059 A * | 3/1996 | Switlik | 296/180.1 |
| 5,542,737 A | 8/1996 | Madden | |
| 6,409,252 B1 | 6/2002 | Andrus | |
| 6,457,766 B1 | 10/2002 | Telnack | |
| 6,467,833 B1 | 10/2002 | Travers | |
| 6,485,087 B1 * | 11/2002 | Roberge et al. | 296/180.5 |
| 6,595,578 B1 * | 7/2003 | Calsoyds et al. | 296/180.4 |
| 6,666,498 B1 | 12/2003 | Whitten | |
| 6,779,834 B1 | 8/2004 | Keller | |
| 6,854,788 B1 | 2/2005 | Graham | |
| 6,915,611 B2 | 7/2005 | Reiman et al. | |
| 7,008,005 B1 | 3/2006 | Graham | |
| 7,147,270 B1 * | 12/2006 | Andrus et al. | 296/180.5 |
| 7,240,958 B2 * | 7/2007 | Skopic | 296/180.1 |
| 7,380,868 B2 | 6/2008 | Breidenbach | |

(Continued)

Primary Examiner—Patricia L Engle
Assistant Examiner—SunSurraye Westbrook
(74) Attorney, Agent, or Firm—Maginot, Moore & Beck LLP

(57) ABSTRACT

A drag reducing apparatus is hingedly mounted to the rear of a truck or trailer vehicle so that the apparatus can be pivoted clear of the rear doors of the vehicle. The apparatus includes a hinge assembly that allows the apparatus to open substantially flat against the side of the vehicle so as not to impede the full movement of the doors. The apparatus includes an arrangement of connected panels that are initially folded flat against the back of the vehicle but automatically open to a drag reducing configuration at a sufficient vehicle speed. The connected panels are further configured so that the force of gravity automatically returns the panels to their initial folded configuration when the vehicle speed falls below a threshold. The apparatus incorporates a modular construction that allows replacement of individual panel sections. The mounting frame is constructed to augment the drag reduction characteristics of the apparatus.

31 Claims, 31 Drawing Sheets

U.S. PATENT DOCUMENTS

| | | | |
|---|---|---|---|
| 7,625,034 B1 * | 12/2009 | Fitzgerald | 296/180.1 |
| 2007/0001481 A1 | 1/2007 | Breidenbach | |
| 2007/0046066 A1 | 3/2007 | Cosgrove et al. | |
| 2007/0126261 A1 | 6/2007 | Breidenbach | |
| 2007/0176465 A1 * | 8/2007 | Wood | 296/180.4 |
| 2008/0048468 A1 | 2/2008 | Holubar | |
| 2008/0116716 A1 * | 5/2008 | O'Grady | 296/180.4 |
| 2008/0309122 A1 | 12/2008 | Smith et al. | |

* cited by examiner

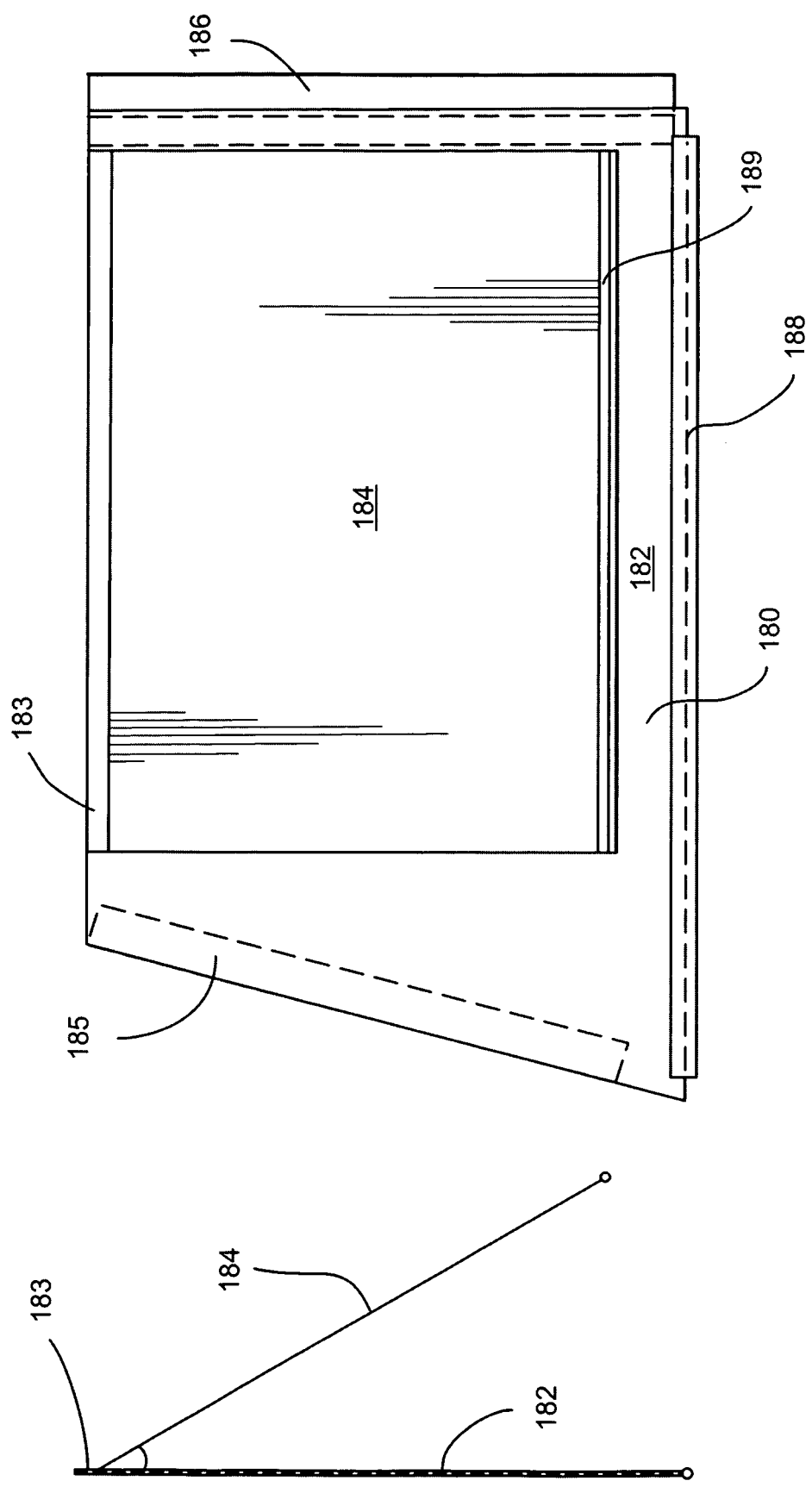

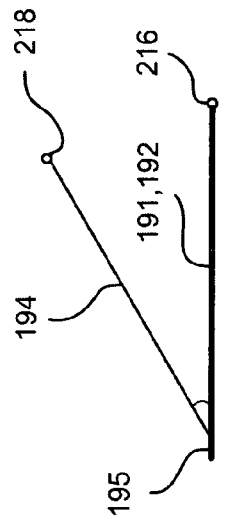
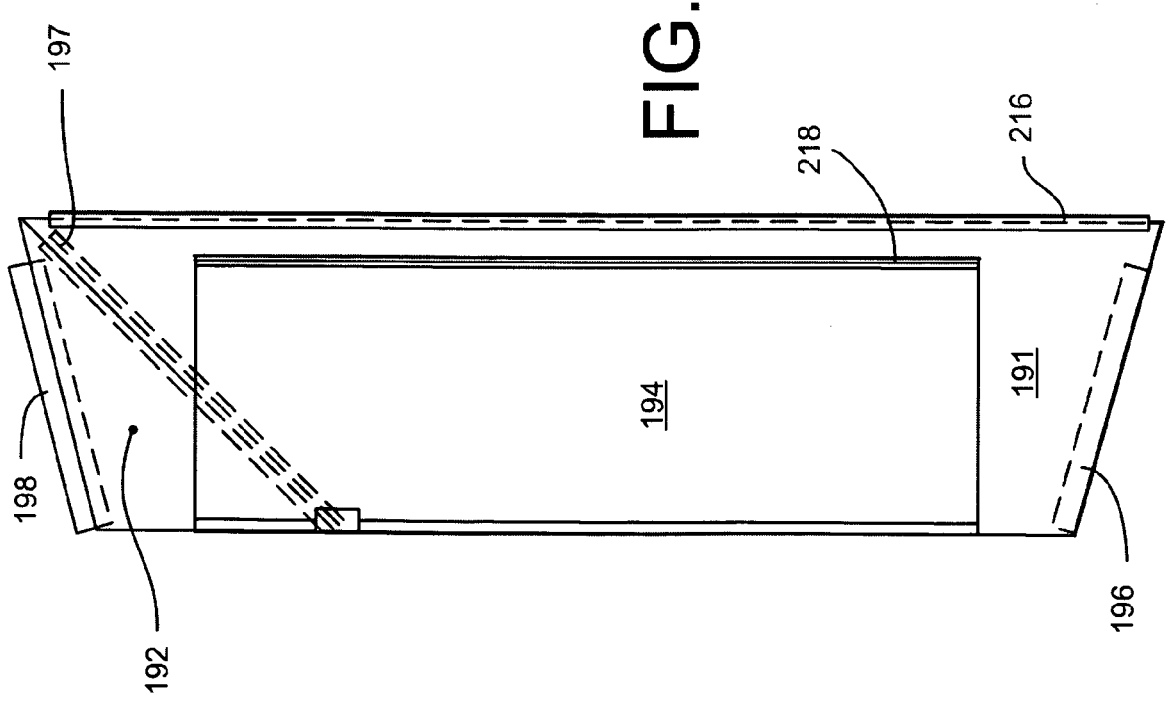
FIG. 25B
FIG. 25A

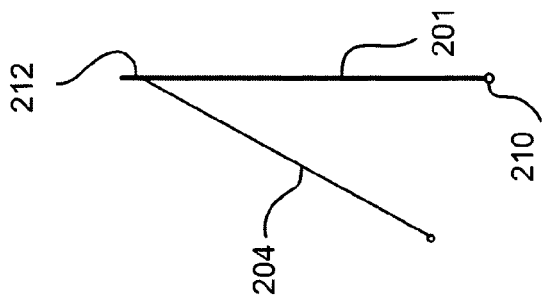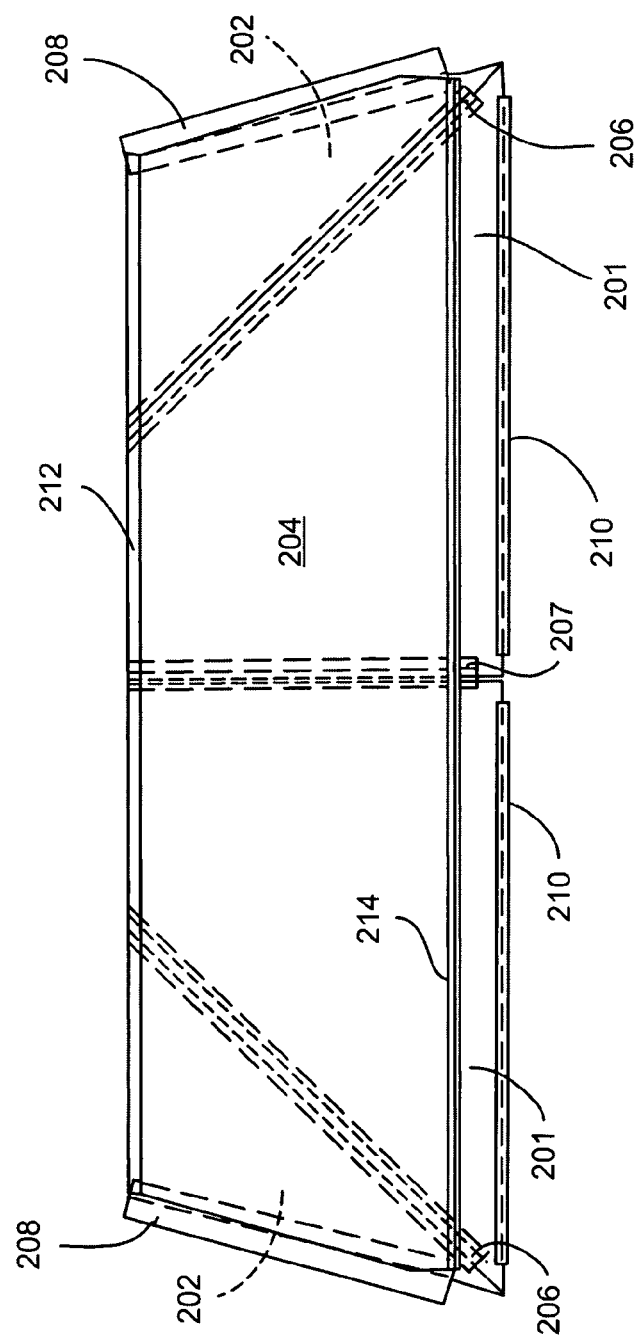

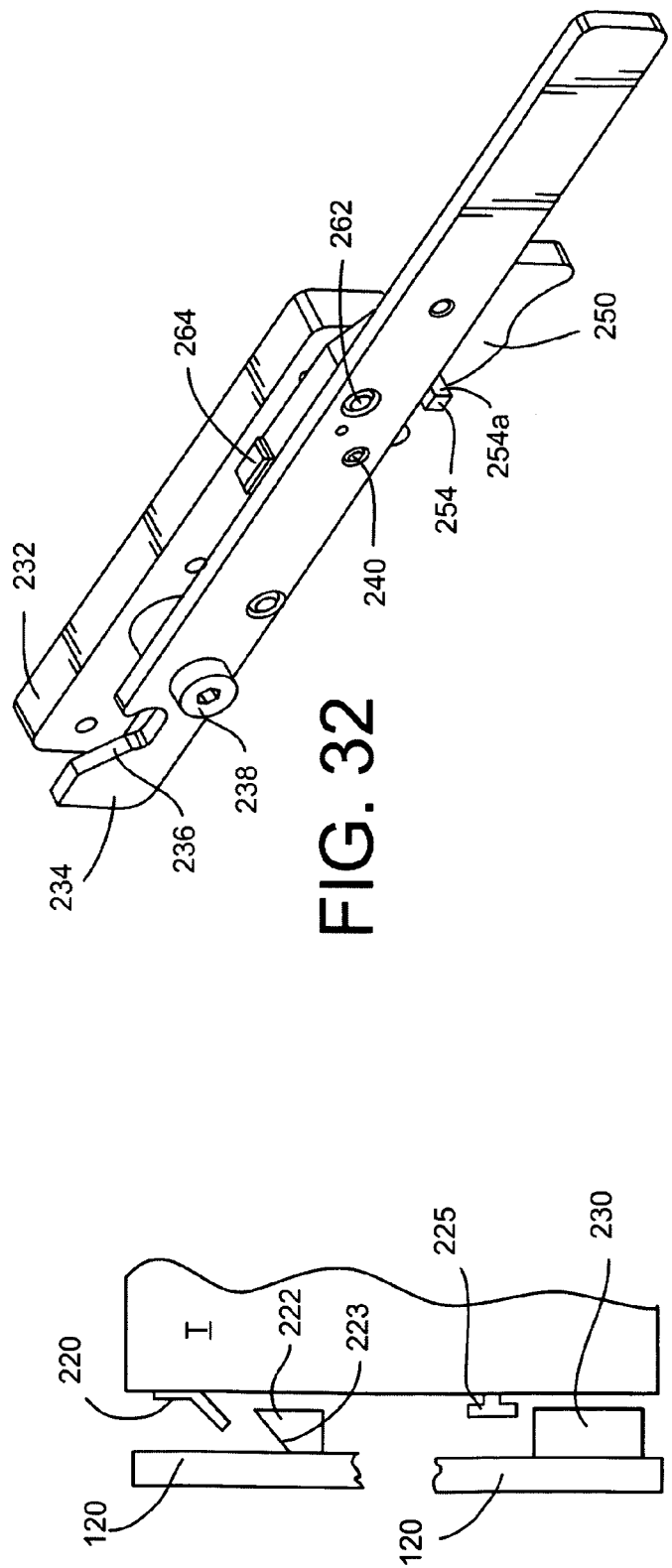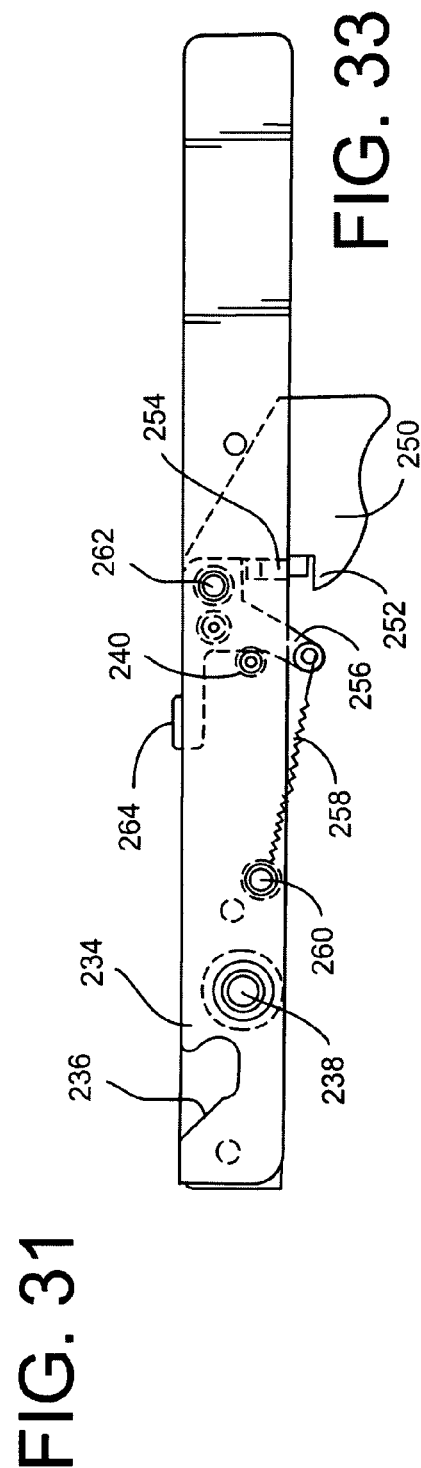

SELF-DEPLOYING DRAG REDUCING DEVICE

CROSS-REFERENCE TO RELATED APPLICATION

This application claims priority to co-pending provisional application No. 61/065,490, filed on Feb. 12, 2008, the entire disclosure of which is incorporated herein by reference.

BACKGROUND

The present disclosure relates to drag reduction devices for land vehicles, such as trucks, tractor-trailer rigs, vans, buses, recreational vehicles and similar vehicles having a large frontal area.

Fuel economy is a persistent concern for all land vehicles and is particularly acute for large vehicles such as trucks and tractor-trailer rigs. Fuel economy improvements have been achieved by innovation in engine design and improvements in fuel composition. However, the size and shape of the vehicles plays a substantial role in fuel economy. Ultimately, drag is the greatest enemy to fuel economy, with as much as 70% of the engine power devoted to cutting through the air in front of the vehicle.

Drag is a force that resists the movement of a body through a fluid, whether the body is a baseball and the fluid is air, or the body is a swimmer moving through water. Drag is a function of two components—friction drag and pressure drag. Friction drag is a force that acts tangential to a surface of the body. Friction drag is increased by irregularities or roughness on the surface and decreased by making the surface more slippery. A clean truck cuts through the air more efficiently and with less friction drag than a dirty truck.

Pressure drag is a force that acts perpendicular to a surface and is a function of the surface area in the direction of travel as well as the velocity or speed at which the body is traveling. Pressure drag increases as the square of velocity so that doubling vehicle speed actually creates four times more pressure drag. On the other hand, pressure drag is directly related to surface area so that a ten percent reduction in surface area leads to a ten percent decrease in pressure drag.

For aerodynamically configured vehicles, such as airplanes, friction drag contributes more heavily to overall drag than pressure drag. However, for land vehicles this relationship is reversed significantly. For a typical tractor-trailer, pressure drag can be as much as ten times greater than friction drag due to the large frontal surface area of the truck. Unfortunately, the size of these types of vehicles is dictated by their function—hauling products or materials. Unlike passenger vehicles, the box-like shape of trucks cannot be significantly altered. A smaller frontal surface area means a smaller truck, which means less cargo that can be hauled. Pressure drag in land vehicles, and especially in trucks, is increased by pressure "hot spots", such beneath the undercarriage, behind the rear of the trailer or between the tractor and the trailer. These hot spots are generally regions of low pressure, which causes air flowing over the vehicle to deviate from a streamlined path around the vehicle. Vortices can form in these hot spots that significantly increase the pressure drag.

In quantitative terms, if a square body has a drag coefficient ($C_D$) of 1.00, elongating the body into a rectangular shape reduces $C_D$ to 0.80. Adding a rounded nose cuts the coefficient in half to 0.40. Adding a "boat tail" or a conical tail decreases $C_D$ further to 0.20. An elliptical body tapered at both ends produces a drag coefficient less than 0.05, but the shape significantly reduces available cargo space and is difficult to produce.

It has been estimated that a 20% reduction in drag yields at least a 10% increase in fuel economy at highway speeds. For truckers and trucking companies, this increase in fuel economy means significantly reduced fuel costs year in and year out. For the environment, increases in fuel economy mean fewer deleterious emissions. A significant amount of effort has been expended in developing drag reduction technology for trucks. These efforts include streamlining the tractor, introducing seals, air deflectors or vortex generators in the gap between the tractor and trailer, and adding undercarriage skirts, guide vanes, air deflectors and boat tails to the trailer. Each of these modifications contributes in some measure to the overall drag reduction, so a fully optimized rig will incorporate a number of these improvements.

One of the greatest contributors to drag reduction is the boat tail or boat tail plates extending from the rear of the trailer. A boat tail reduces drag by about five percent. The typical boat tail is a large shell that is mounted over the rear doors of the trailer. Such devices are cumbersome to install and remove. Moreover, the large unitary shell is difficult to store when access to the rear doors is desired, such as to unload the trailer. An improved drag reducing device will provide the same aerodynamic benefits as the traditional boat tail without the undesirable attributes.

SUMMARY

In one embodiment, a drag reducing apparatus for a vehicle comprises an upper panel section, a lower panel section and opposite side panel sections, each of the panel sections hingedly mountable around a perimeter of the rear of the vehicle. The upper panel section is hingedly connected to an upper end of each of the side panel sections while the lower panel section is hingedly connected to a lower end of each of the side panel sections. The panel sections have a folded state in which each panel section is substantially flat against the frame with the side panel sections overlying the lower panel section and the upper panel section overlying the side panel sections. In one aspect, the hinged connections between panel sections are configured so that the panel sections automatically move from the folded state to an extended state at an airflow around the rear of the vehicle sufficient to pivot at least the upper panel section upward from the folded state. As the upper panel pivots upward, it pulls the side panel sections outward, which in turn pull the lower panel section outward to an aerodynamic drag-reducing shape.

In a further aspect, the drag reducing apparatus further comprises a frame having a perimeter and opposite side sections, in which the panel sections are hingedly connected to the perimeter of the frame. A hinge arrangement, attachable to the rear of the vehicle, is provided at one of the side sections of the frame. A latch arrangement is provided at the other side section of the frame, and is configured to releasably lock the frame to the rear of the vehicle. The hinge arrangement allows the entire drag reducing apparatus to be pivoted out of the way of the rear of the vehicle to permit access, for example, to loading doors of the vehicle.

In another aspect, the frame, the upper panel section and the lower panel section include a center hinge arrangement configured to permit one of said side sections of the frame to be pivoted about the center hinge arrangement onto the other side section when the panel sections are in the folded state. This feature allows only one side of the apparatus to be moved clear of one side of the rear of the vehicle, such as to access a single door. In addition, this feature, combined with the hinged attachment, allows the entire apparatus to be folded in half and then pivoted clear of the rear of the vehicle.

In a further embodiment, a drag reducing apparatus for a vehicle having a pair of opposing rear doors hinged from the sides of the vehicle, comprises a frame having a perimeter and connectable to the rear of the vehicle and offset therefrom to accommodate the rear door hinges, an upper panel section, a lower panel section and opposite side panel sections. Each of the panel sections is hingedly connected around the perimeter of the frame, while the upper panel section is hingedly connected to an upper end of each of the side panel sections and the lower panel section is hingedly connected to a lower end of each of the side panel sections. The hinged connections between panel sections is configured so that pivoting one of the panel sections about a hinged connection automatically moves all of the panel sections from a folded state in which the panel sections are substantially flat against the frame to an extended state in which the panel sections project outward from the perimeter. The apparatus further includes a series of plates attached to the frame around the perimeter and disposed between the panel sections in the folded state and the rear of the vehicle. These inboard panels help offset or cancel the drag effects caused by the offset or gap between the apparatus and the rear of the vehicle.

In another feature, the hinged connection between each of the panel sections and the perimeter of the frame includes a sliding interlocking interface. In one embodiment, this interface includes a rib in sliding interlocking engagement with a slotted beam forming the perimeter of the frame. This sliding interlocking interface simplifies construction and allows a given panel section to be removed and replaced.

Another aspect of certain embodiments of the drag reducing apparatus resides in the hinged connections between panel sections including a removable fastener strip. This fastener strip permits removably connecting adjacent panel section together, which simplifies assembly and facilitates removal and replacement of a particular panel section.

In yet another feature, the drag reducing apparatus includes tether sheets connected between the free edge of the panel sections and the apparatus frame. The tether sheets fold with the panel sections in the folded state. When the panel sections move to the extended state, the panel sections extend at an angle from the free edge of the panel section to the apparatus frame. In certain embodiments, the tether sheets at the upper and side panel sections are formed of a mesh material, while the tether sheet for the lower panel section is substantially solid for rain and snow run-off.

One benefit of the drag reducing apparatus disclosed herein is that it may be self-deployed and automatically deployed or undeployed based on the speed of the vehicle. Air pressure at the rear of the vehicle moves the apparatus to its deployed state, while gravity operates to return the apparatus to its undeployed state. As needed, the apparatus may also be easily deployed or stowed manually by the vehicle operator.

A further benefit of the present apparatus is that in its undeployed or folded state the apparatus is tightly folded against the rear of the vehicle and is folded in a manner that prevents inadvertent unfolding or deployment. The apparatus unfolds into its deployed state or folds into its undeployed state with little risk of fouling since the panels of the apparatus are hinged in a pre-determined relationship.

Yet another benefit is provided by the frame structure of the apparatus that is easily mountable to the rear of a vehicle. The frame structure is configured to allow the stowed apparatus to assume as small an envelop as possible to reduce its impact on opening the rear swing doors of the truck. The frame structure is further configured to be easily moved by hand to and from the stowed position, without the need for tools. Other benefits and objects of the drag-reducing apparatus can be discerned from the following description along with the accompanying figures.

DESCRIPTION OF THE FIGURES

FIGS. 24a, 24b are plan and side views, respectively, of an upper panel section of the drag reduction apparatus shown in FIGS. 22-23.

FIGS. 25a, 25b are plan and side views, respectively, of a side panel section of the drag reduction apparatus shown in FIGS. 22-23.

FIGS. 26a, 26b are plan and side views, respectively, of a lower panel section of the drag reduction apparatus shown in FIGS. 22-23.

FIG. 31 is a side representation of the latch arrangement for engaging the apparatus of the present embodiment to the trailer.

FIG. 32 is an enlarged perspective view of a latch assembly of the latch arrangement shown in FIG. 31.

FIG. 33 is a side view of the latch assembly shown in FIG. 32.

DESCRIPTION OF THE ILLUSTRATED EMBODIMENTS

Figure 1:
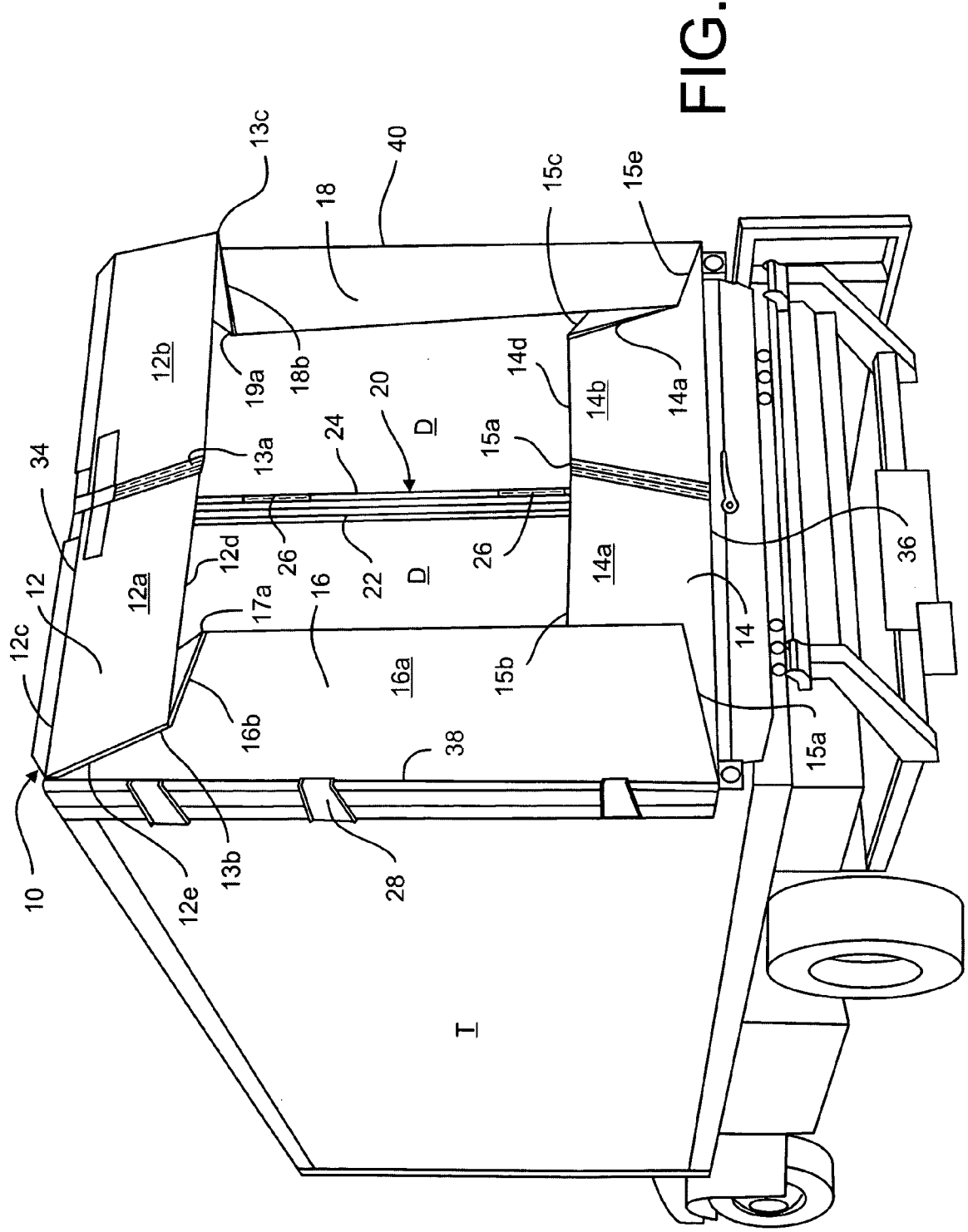
FIG. 1 is a perspective view of a drag reducing apparatus according to one embodiment, shown mounted on the rear of a vehicle in its initial undeployed state.
Figure 2:
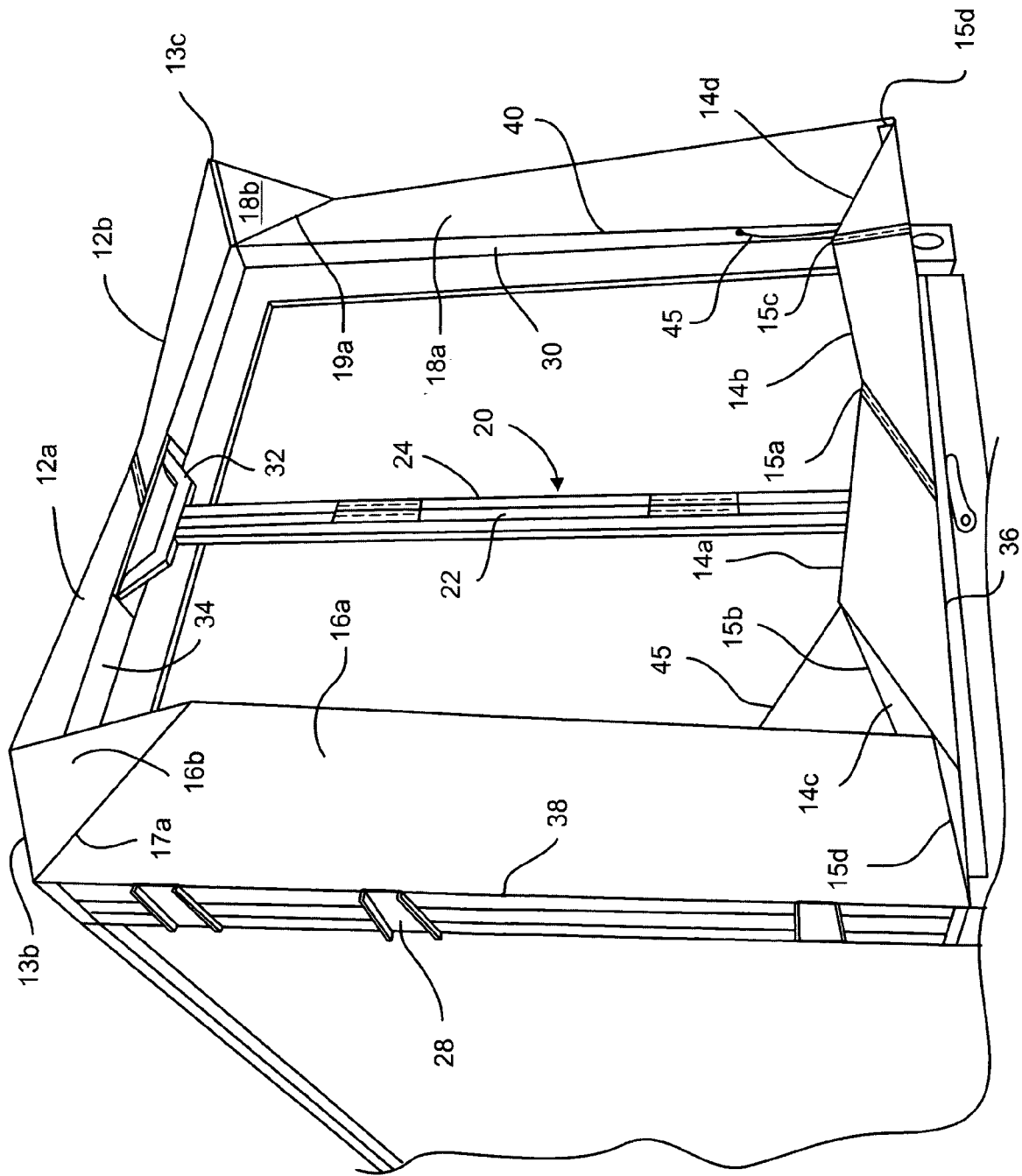
FIG. 2 is a perspective view of the drag reducing apparatus shown in FIG. 1 as the apparatus is moving from its undeployed state to its deployed state.

Details of a drag reducing apparatus 10 are illustrated in FIGS. 1-2. The apparatus 10 can be self-deploying, meaning that the apparatus deploys or extends automatically as the speed of the vehicle on which it mounted increases. Alternatively, the apparatus can be manually deployed and stowed. The apparatus simulates a truncated boat tail in its deployed position, shown in FIG. 2, thereby providing the vehicle with the aerodynamic benefits associated with devices of this type. The drag reducing apparatus 10 is formed of an arrangement of lightweight panels hinged together so that the panels may assume a compact folded configuration in its undeployed stated shown in FIG. 1. The apparatus is configured to automatically unfold and fold depending upon the speed of the vehicle and the air pressure experienced at the rear of the vehicle.

As shown in FIGS. 1-2, the apparatus 10 is mounted to the rear of a truck or trailer T, encircling the doors D of the vehicle. The doors D may be the double-door or "barn door" type depicted in the figure, or other forms of rear doors, such as a single hinged door or a roll up door. When mounted to the vehicle, the apparatus essentially blocks access to the doors. Thus, in one aspect of the apparatus 10, the apparatus is capable of being moved to a stowed position clear of the doors D to provide access for loading or unloading the truck T.

In one embodiment, the drag reducing apparatus includes an upper panel section 12, a lower panel section 14, a left side panel section 16 and a right side panel section 18. In the undeployed state, shown in FIG. 1, the panel sections are folded over each other to sit close to the rear of the truck T. The panels are preferably formed of a lightweight yet resilient material, such as a polymer or composite material. The panels must be sufficiently rigid to hold their shape in the deployed state shown in FIG. 2 without sagging or flexing. Moreover, the panels must be sufficiently stiff to allow the apparatus to unfold automatically in the manner described herein. Thus, in a specific embodiment, the panels are formed of a fiber reinforced polypropylene or polyethylene, with a thickness of about 0.06-0.13 inches.

The upper panel section 12 is formed of two panels 12a and 12b joined by a center hinge 13a, while the lower panel 14 section similarly includes two panels 14a, 14b joined by a center hinge 15a. The two upper panels 12a, 12b combine to form a slightly trapezoidal shape. Specifically, the combined length of the leading edge 12c is approximately equal to the width of the truck T, while the combined length of the trailing edge 12d is slightly shorter. Thus, the side edges of the panels 12a, 12b angle slightly inward from the leading edge. The lower panels 14a, 14b also combine to form a more pronounced trapezoidal shape. The leading edge of the lower panels has a combined length equal to the combined length of the leading edge of the upper panel section. However, the trailing edge 14d is shorter than the trailing edge 12d so that the side edges 14e are at a greater angle relative to the leading edge of the lower panels. The difference in trapezoidal shapes of the upper and lower panel sections are a function of the manner in which the apparatus 10 is configured to unfold, as explained in more detail herein.

The left and right side panel sections 16, 18 are mirror images. Thus, the left side panel section 16 includes a center panel 16a and an intermediate panel 16b positioned between the center panel 16a and upper panel 12a. The intermediate panel 16b is connected to the center panel 16a by a hinge 16b, while the intermediate panel is connected to the upper panel 12b by a hinge 13b. The right side panel 18 is formed by a center panel 18a connected by hinge 19a to an intermediate panel 18b, which is then connected to the upper panel 12a by a hinge 13c.

The center panels 16a, 18a of the side panel sections 16, 18 are also connected by hinges to the lower panel section 14. The lower panel section 14 includes the aforementioned panels 14a, 14b, in addition to intermediate panels 14c, 14d, best seen in FIG. 2. The intermediate panels 14c, 14d are connected by hinges 15b and 15c to a corresponding lower panel 14a, 14b. The intermediate panels 14c, 14d are also connected to a corresponding side center panel 16a, 18a by hinges 15d, 15e. It can be appreciated that the lower panel section 14 provides a generally rectangular shape co-extensive with the upper panel section 12. However, the lower panel section includes the two panels 14a, 14b, as well as the two intermediate panels 14c, 14d that unfold into an essentially flat panel section in the deployed state shown in FIG. 2.

In the illustrated embodiment, each of the hinges 13a-13c, 15a-15e, 17a and 19a are shown as traditional pintle-type hinge. However, other types of hinges are contemplated, including "living" hinges formed as part of the panels themselves or hinges formed using high-strength tape spanning panel sections. The hinges should be capable of repeated pivoting with only minimal resistance. Moreover, the hinges should be capable of a wide range of pivoting. For instance, as described in more detail herein, all of the hinges pivot through at least about 90 degrees, with the hinges 15b, 15c pivoting through almost 180 degrees. The center hinges also pivot through about 180 degrees, although these hinges only play a role in stowing the apparatus, rather in its movement between undeployed and deployed states, as explained herein.

As shown in FIG. 1, in the undeployed state of the apparatus 10, the panel sections are folded onto each other and most preferably are folded so that the upper panel section 12 overlaps the side panel sections 16, 18, which overlap the lower panel section 14. This configuration takes advantage of the force of gravity to restore the panels from the deployed state of FIGS. 2-3 to the undeployed or folded state of FIG. 1. The sequence of movements of the panel sections from undeployed to deployed states is shown in FIGS. 4-8.

In one embodiment, it is contemplated that the drag reducing apparatus 10 may be self-deployed, meaning that the panels automatically unfold as the truck T is traveling down the road. In particular, it is known that a region of low pressure trails the rear of a truck as it travels. As the speed increases, the pressure decreases, which coaxes the upper panel section 12 to pivot upward, more or less in the manner that lift is generated over an airplane wing. As the upper panel section 12 pivots, it pulls the intermediate panels 16b and 18b. As the intermediate panels move upward and pivot about the respective hinges 13b and 13c, the intermediate panels pull the center panels 16a and 18a, causing them to pivot outward. As the center panels pivot, they pull the lower intermediate panels 14c and 14d, which in turn pull the lower panels 14a and 14b outward. The hinges constrain the panel sections 12, 14, 16 and 18 to move essentially in unison as the primary panels 12a/12b, 14a/14b, 16a and 18a pivot outward, guided by the four intermediate panels 16b, 18b, 14c and 14d. The side intermediate panels 16b, 18b pivot and translate until they are generally co-planar with the corresponding side center panels 16a, 18a. Likewise, the lower intermediate panels 14c, 14d pivot and translate until they are co-planar with the lower panels 14a, 14b, as shown in FIG. 8.

It is also contemplated that the apparatus 10 may be manually deployed by the truck operator prior to driving on the road. Once one of the panels is manually displaced toward its deployed position, all of the panels unfold in the same manner described above. Thus, in one approach, the operator can pull the lower panel section 14 downward, which will "transmit" this deployment movement first to the intermediate panels 14c, 14d, then to the side panels 16, 18. As the side panels swing outward from the truck doors D, this deployment movement is "transmitted" to the side intermediate panels 16b, 18b, which then in turn cause the upper panel section 12 to pivot upward to its deployed position. This same deployment action can occur is one of the side panels 16, 18 is swung outward. The hinged connection between the various panels ensures that moving any large panel to its deployed position will cause the other panels to become deployed.

Figure 3:
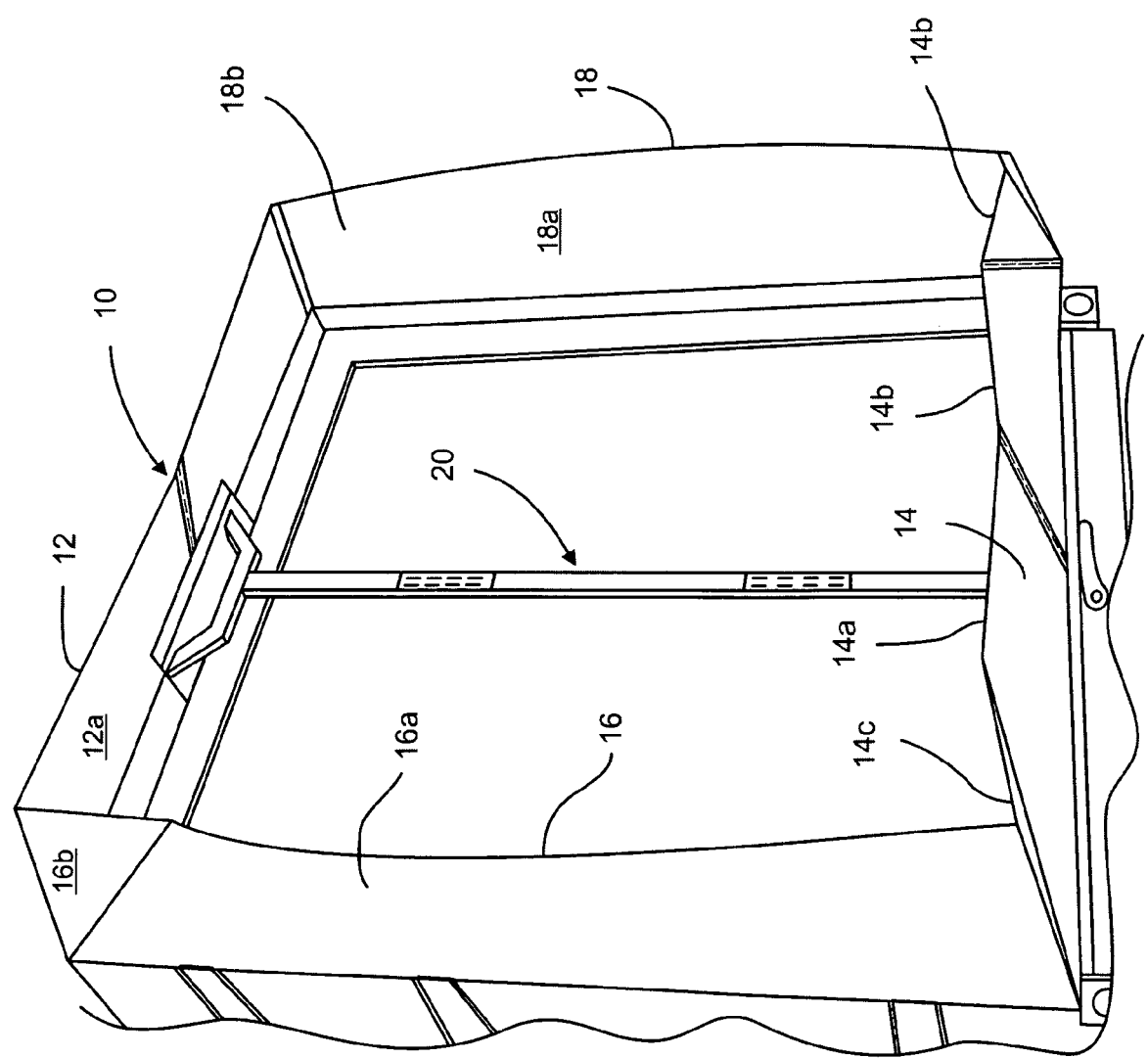
FIG. 3 is a perspective views of the drag reducing apparatus shown in FIG. 1 with the apparatus in its deployed state
Figure 8:
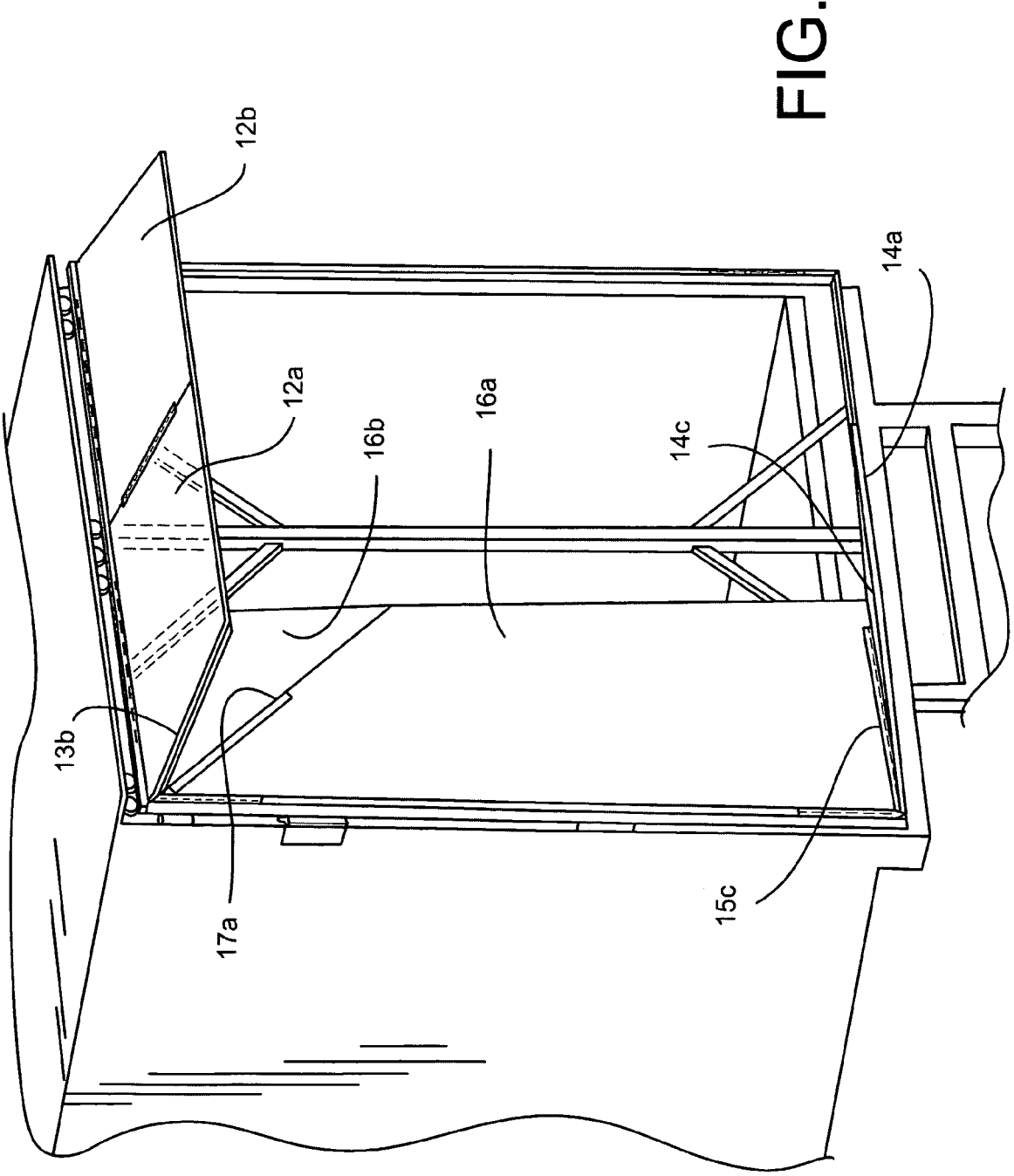

The apparatus 10 remains in its deployed state of FIGS. 2-3 and 8 as long as the air pressure behind the truck T is at a pre-determined level. In a specific embodiment, the apparatus is calibrated to deploy when the truck is traveling above about 35 m.p.h. When the truck slows below this threshold speed, the pressure behind the truck is unable to keep the panels "inflated". Gravity works on the upper panel section 12 causing it to begin to pivot downward. As the speed of the truck continues to drop, the upper panel section continues to pivot and the apparatus starts to fold back its deployed state. The sequence of movements of the panels essentially occurs in reverse sequence from that depicted in FIGS. 4-8. In order to assist in the folding movement, an elastic element 45, such as a bungee cord shown in FIG. 2, may be connected between the fixed frame 20 and the lower panels 14a, 14b. The elastic elements can help overcome the effects of gravity that attempt to hold the lower panels down during the folding steps. The elastic elements may also help support the lower panels in their deployed state. In addition, or alternatively, the lower panel section 14 may be lighter than the upper panel section 12 to thereby further bias the apparatus to be self-closing.

The apparatus 10 may always be manually deployed by the truck operator before getting on the road. In certain embodiments, manual deployment is the principal means for deployment in lieu of the automatic deployment at a particular vehicle speed. In these embodiments, the panels can be configured to remain in their deployed configuration until manually stowed by the operator. In certain specific versions, friction in the hinges may be sufficient to keep the apparatus deployed, even under the forces of vibration and shock from hitting chuckholes in the road. In other versions, the hinges may incorporate a friction catch that holds the hinges in the deployed or stowed positions, or both. As a further variation, the panels and hinges can be configured so that the hinges move past a "neutral" position in the deployed configuration so that additional force is necessary to move the hinge past this neutral position to fold the panels.

In order to assist in the automatic deployment of the panels, the upper panel section 12 may be configured to capture air flowing over the top of the truck T and direct the air beneath the panel section—i.e., between the rear of the truck and the inner surface of the panels. Thus, as the truck speed increases, the airflow beneath the upper panel section will increase to gradually push the upper panel section 12 upward. This diverted airflow may pass through a gap defined between the leading edge 12c of the upper panel section 12.

Figure 9:
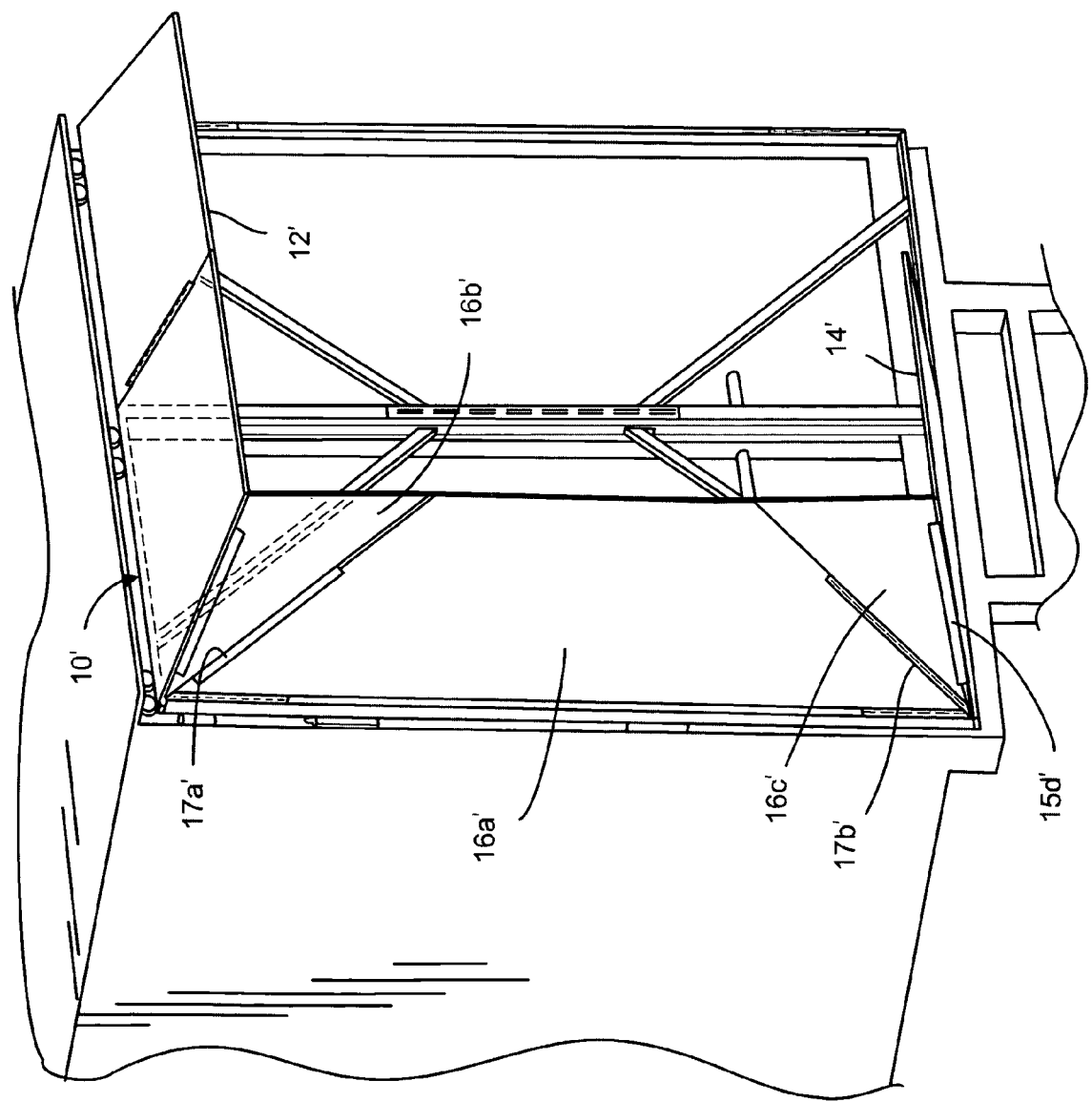
FIG. 9 is a rear perspective view of an alternative embodiment of the drag reducing apparatus with one side panel section and a lower panel removed for clarity.

In an alternative embodiment, the drag reducing apparatus 10' shown in FIG. 9 includes modified side and lower panel sections. In particular, these panel sections are modified so that all of the intermediate panels are incorporated into the side panel sections. The upper and lower panel sections 12' and 14' are thus identically configured. The side panels, such as side panel 16' shown in FIG. 9, includes a center panel 16a', an upper intermediate panel 16b' and a lower intermediate panel 16c', all joined by hinges 17a' and 17b'.

Figure 10:
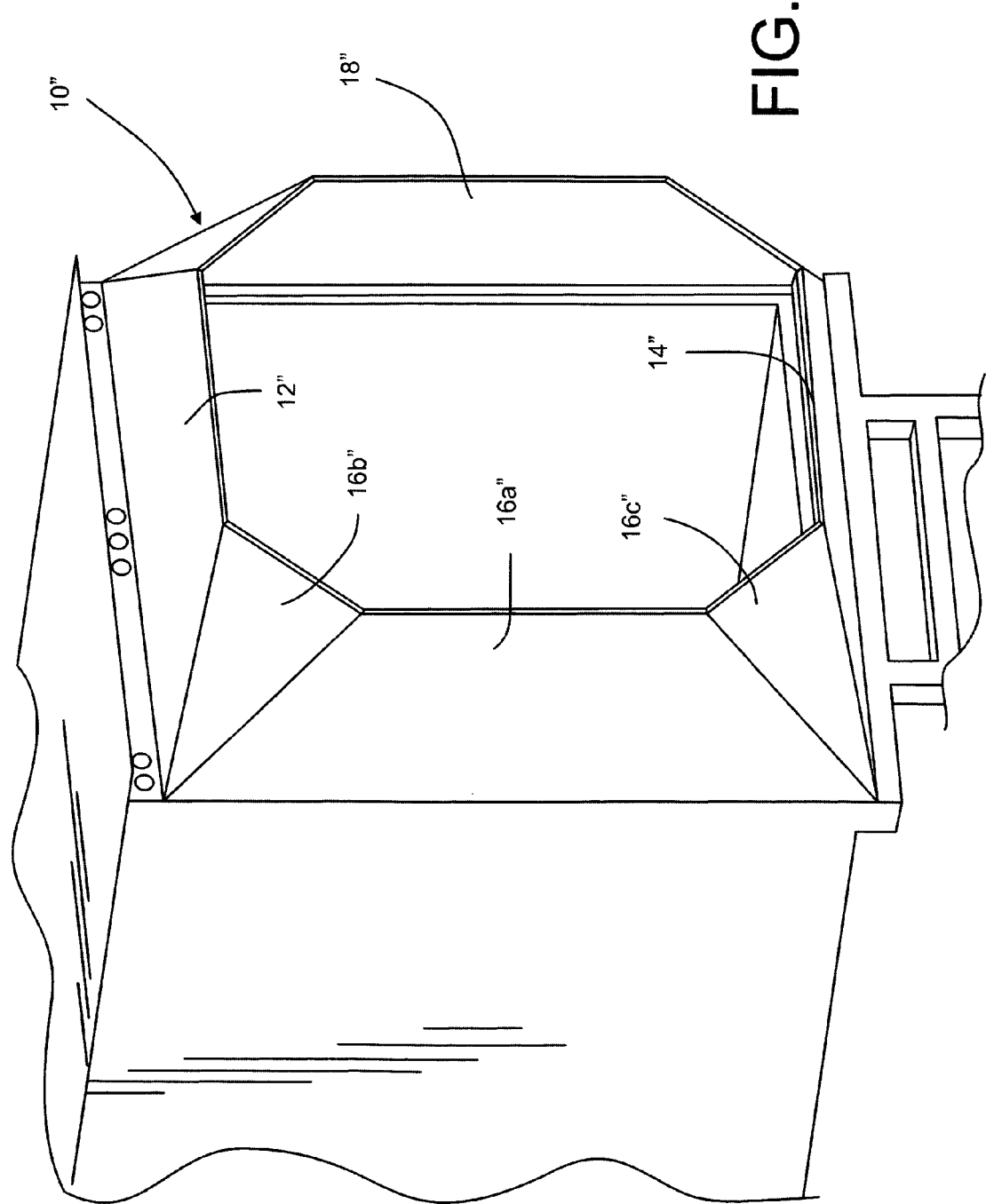
FIG. 10 is a perspective view of a frusto-conical embodiment of the drag reducing apparatus, with the apparatus shown in its deployed state.

In a further modification, the panels of the apparatus can be configured so that the apparatus tapers slightly inward at all sides. Thus, in the deployed state shown in FIG. 10, the apparatus 10" is in a frusto-conical form. The intermediate panels 16b" and 16c" are at an angle to, and therefore not coplanar with, the upper, lower and side center panels.

As explained above, the apparatuses 10, 10' and 10" are mounted to the rear of the vehicle, and therefore block access to the rear doors. Thus, another feature of the apparatus 10 is incorporated into the manner in which the apparatus is mounted to an existing vehicle. In particular, the apparatus 10 is configured to move from its operating position shown in all of the figures thus far, to a stowed position, as shown in FIGS. 11-14.

Figure 4:
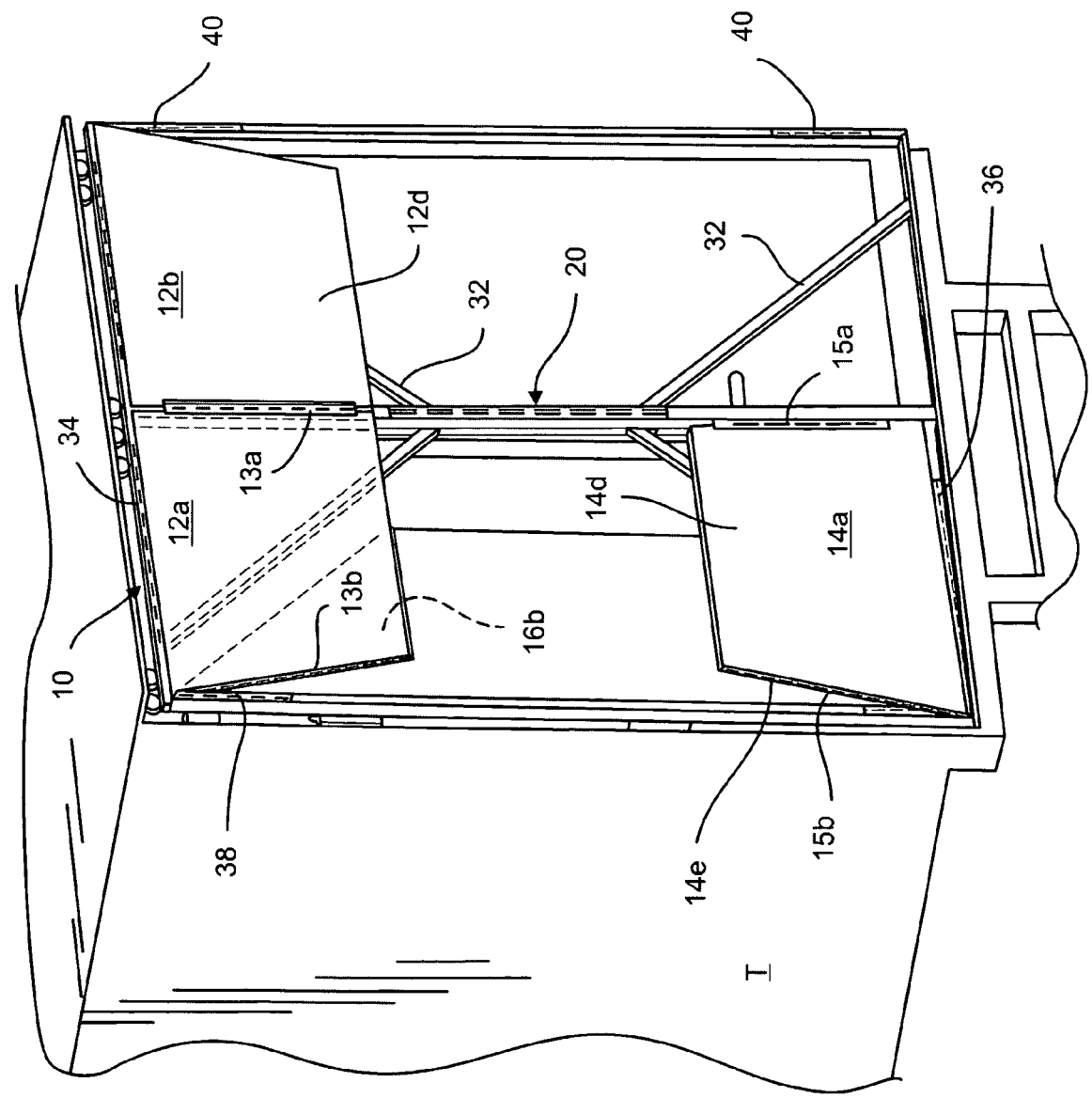
FIG. 4 is a rear perspective view of the drag reducing apparatus depicted in FIG. 1 shown in its initial undeployed state with one side panel section and a lower panel removed for clarity.
Figure 5:
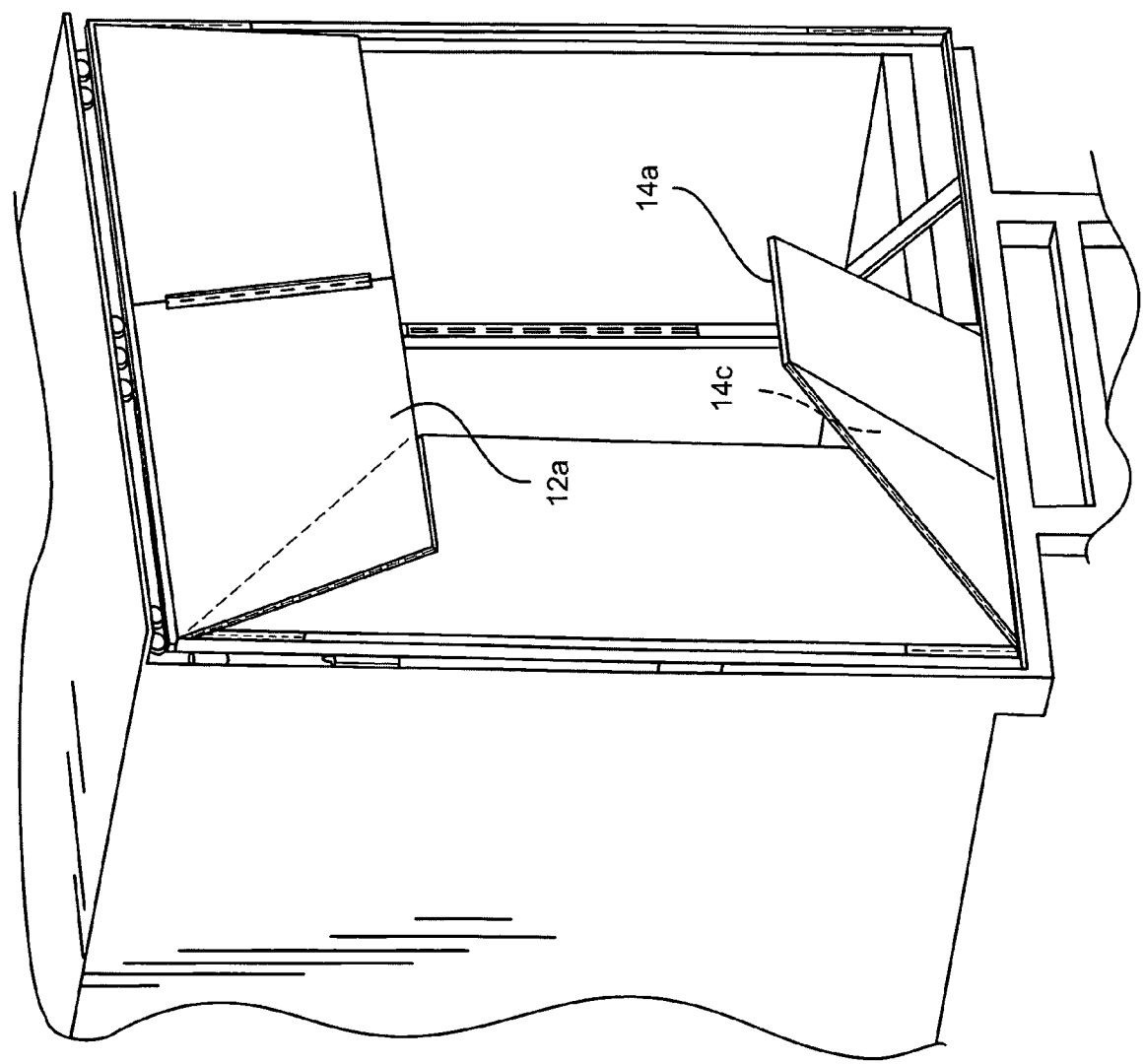
FIGS. 5-8 are perspective views of the drag reducing apparatus depicted in FIG. 4 illustrating the apparatus in sequential stages of movement from its undeployed state to its deployed state.
Figure 6:
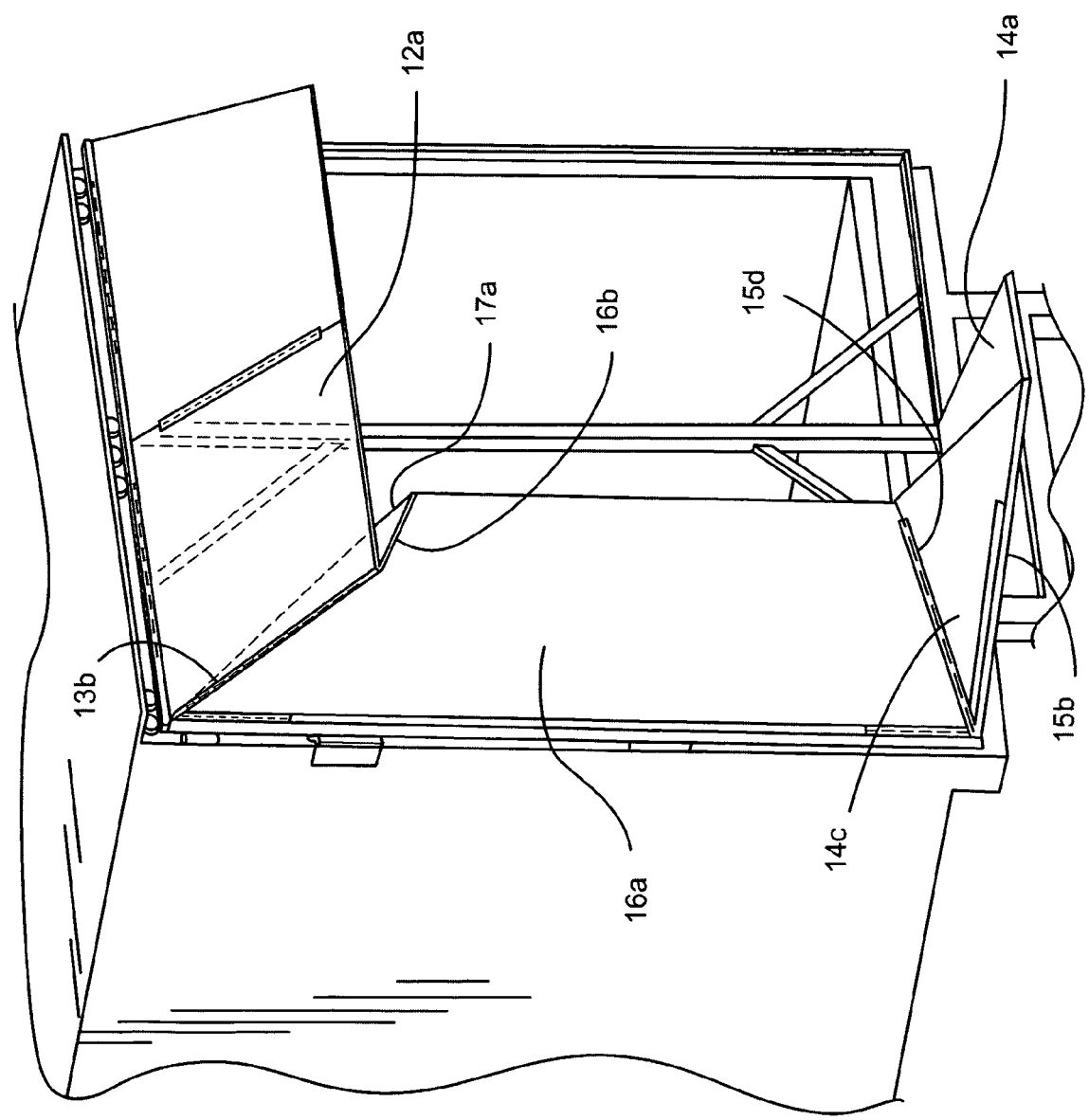
Figure 7:
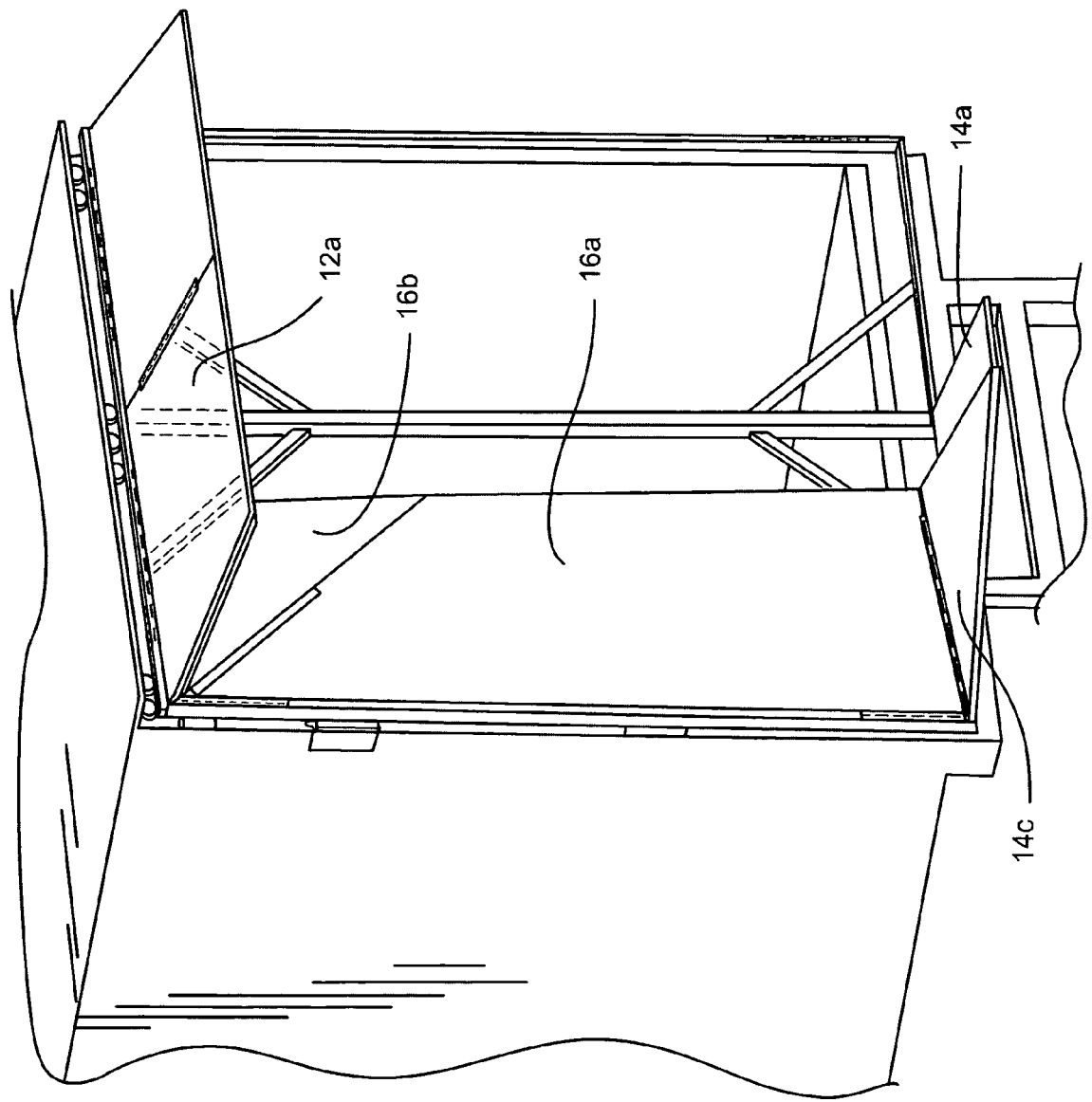

Referring first to FIGS. 1, 2 and 4, the apparatus 10 includes a mounting frame 20 that is rectangular and generally corresponds to the perimeter of the rear of the truck while providing clearance for necessary upper and lower lights for instance, as seen in FIG. 1. The mounting frame 20 includes a left frame section 22 and a right frame section 24 connected to each other by a center hinge 26. The panel sections are pivotably mounted to the frame sections by a series of hinges, namely hinge array 34 for the upper panel section 12, hinge array 36 for the lower panel section 14, left side array 38 for the left side panel section 16 and right side array 40 for the right side panel section 18. The hinges can be the standard pintle-type hinges capable of repeated pivoting and able to withstand the elements on a moving vehicle, or may another hinge arrangement including the alternative hinges discussed above.

The mounting frame 20 includes elements for mounting the frame, and therefore the entire apparatus 10, to the rear of a vehicle. Thus, the frame includes a left side mounting element 28 and a right side mounting element 30 configured to fasten the corresponding frame sections 22, 24 to the vehicle. In one embodiment, the mounting elements can be catch and latch arrangements on both sides of the frame. The entire apparatus is thus removed from the vehicle by releasing the catch and latch arrangement. However, it is preferred that the apparatus 10 remain mounted to the vehicle, rather than removed in its entirety. Thus, in a preferred embodiment, the left side mounting element is an array of hinges 50, while the right side mounting element 30 may be an array of latch components. The latch components can be a variety of types that preferably may be easily latched and unlatched, while providing a solid positive engagement that can endure wind loads and vibrations associated with a truck traveling at highway speeds.

Figure 11:
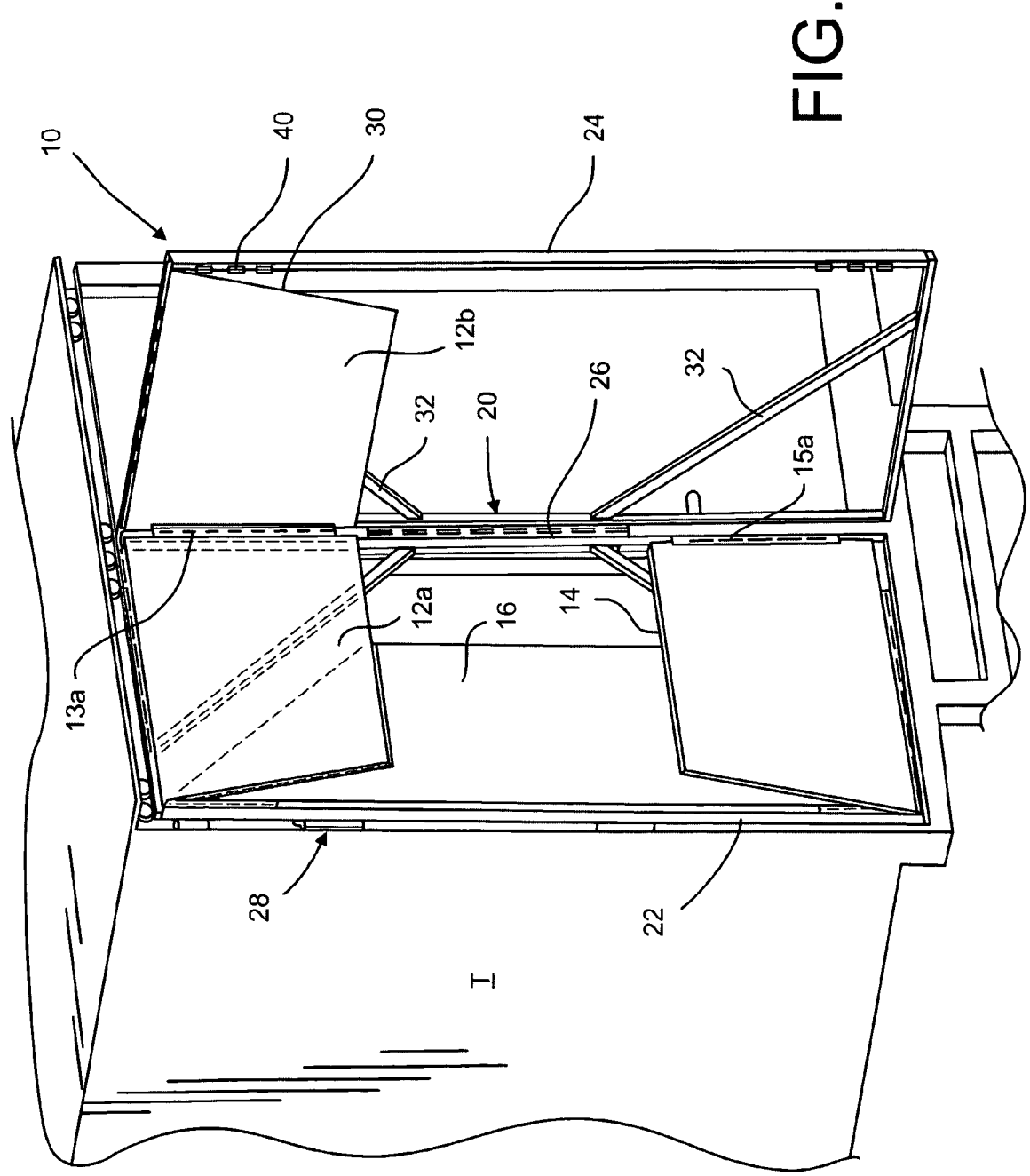
FIGS. 11-14 are perspective views of the drag reducing apparatus illustrated in FIG. 1 being moved to a stowed position clear of the rear doors of the trailer.
Figure 12:
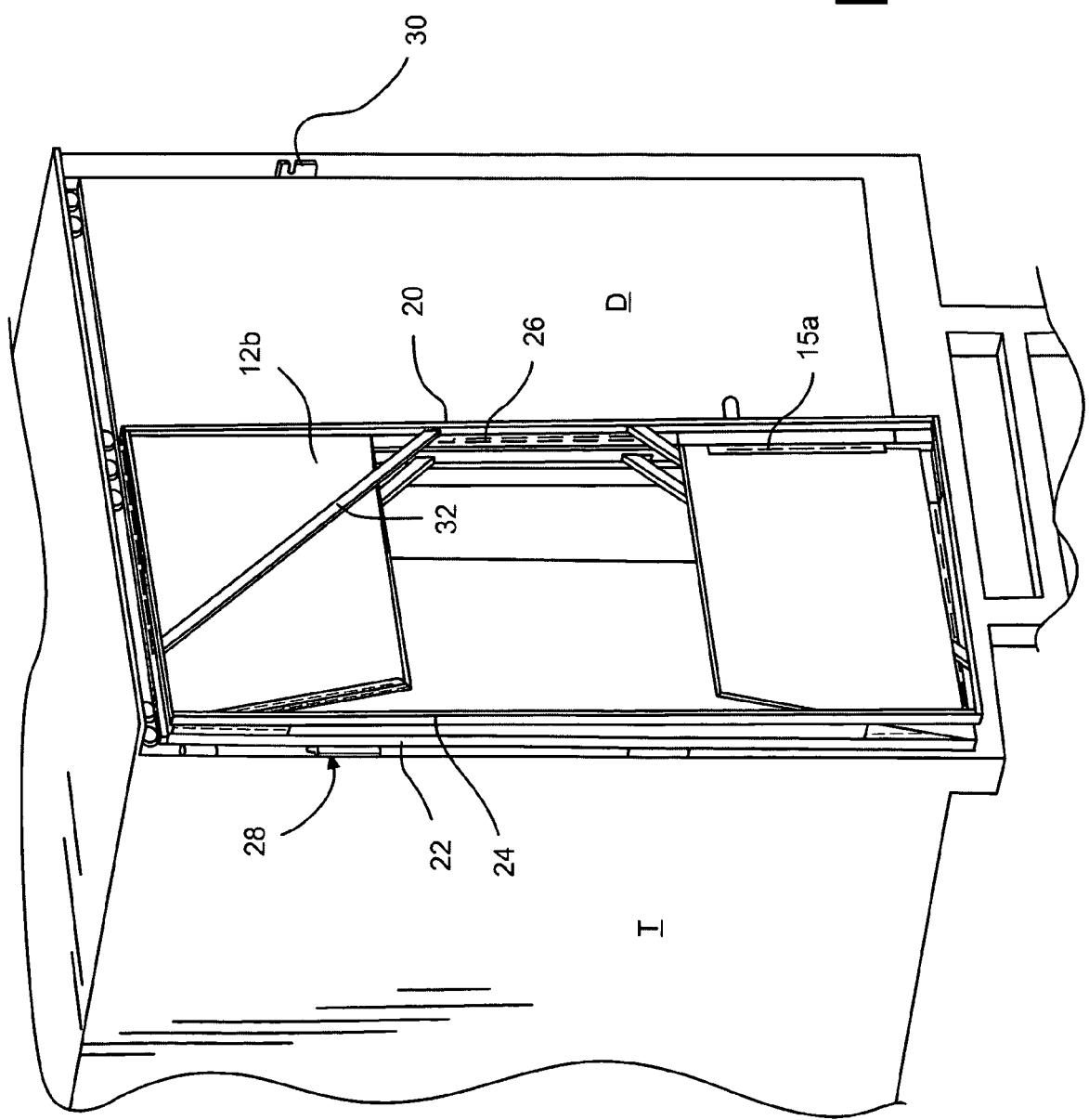
Figure 13:
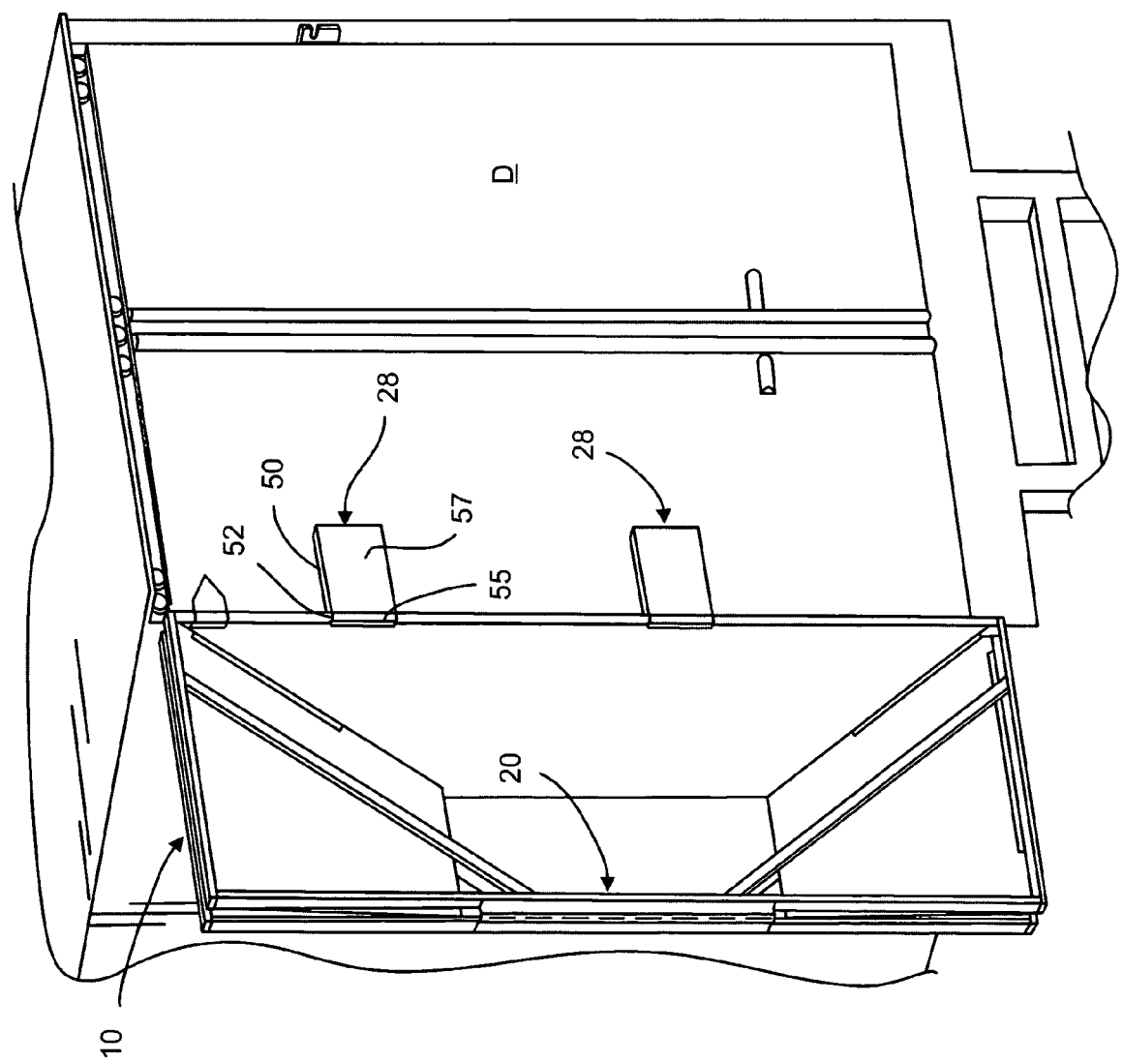

The latch components of the right side mounting element 30 are configured to be released to allow the entire apparatus 10—frame 20 and the panel sections—to pivot to the side of the truck. Thus, as shown in FIG. 11, when the right side latches 30 are released, the right side frame section 24 may be pivoted about center hinge 26. It should be apparent that the center hinges 13*a* and 15*a* at the upper and lower panel sections 12, 14 allow the panel sections to be folded over as the right frame section pivots. The right side frame section 24 is pivoted until it directly overlies the left side frame section 22, as shown in FIG. 12. The entire drag reducing apparatus 10 can then be pivoted about the left side mounting hinges 28, as depicted in FIG. 13.

Figure 14:
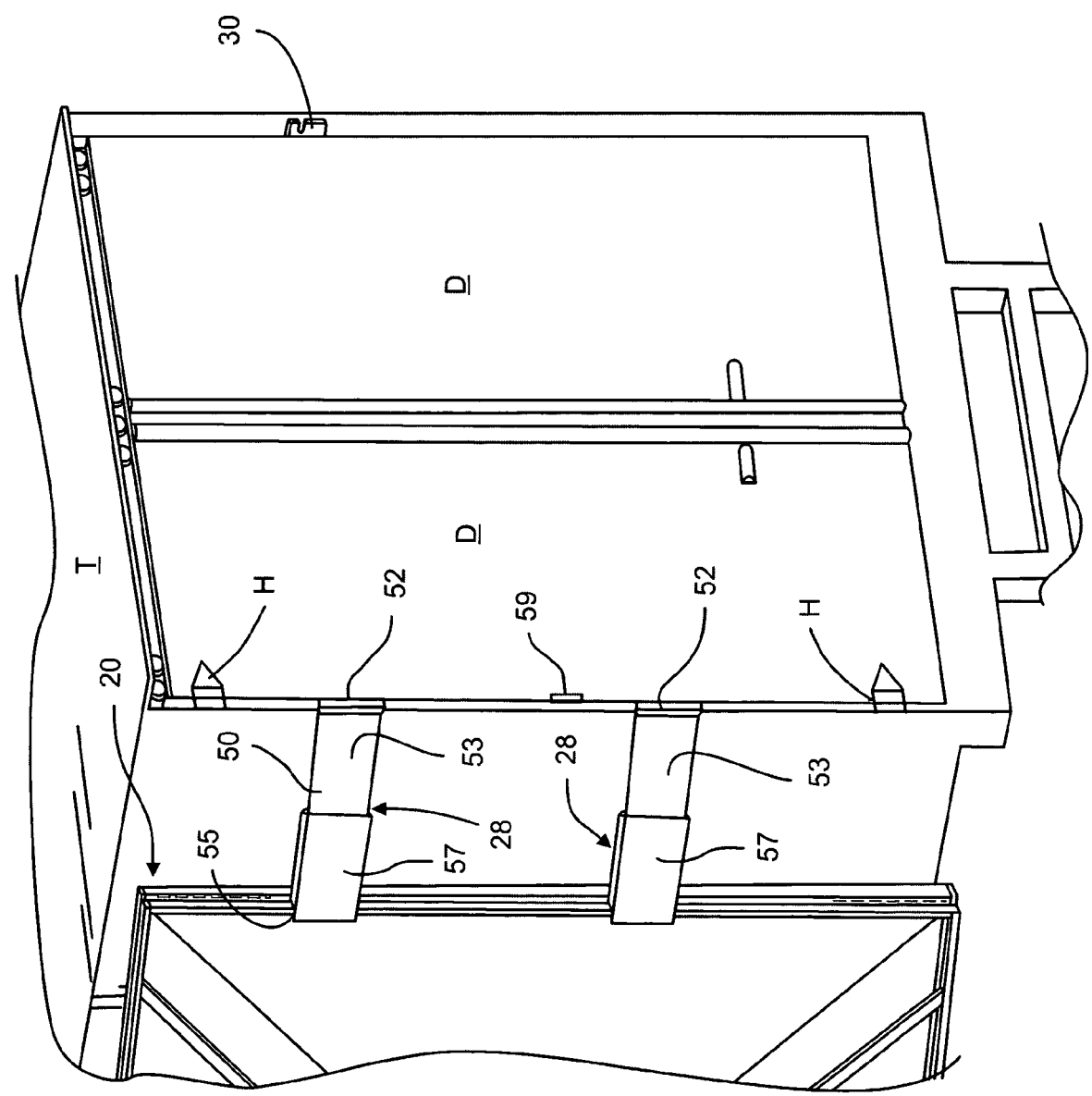

It can be noted in FIG. 14, that a latch 59 may be provided on the left side of the truck T. The latch 59 may be configured like the right side latch 30 to engage a portion of the respective frame section 22, 24.

Figure 15:
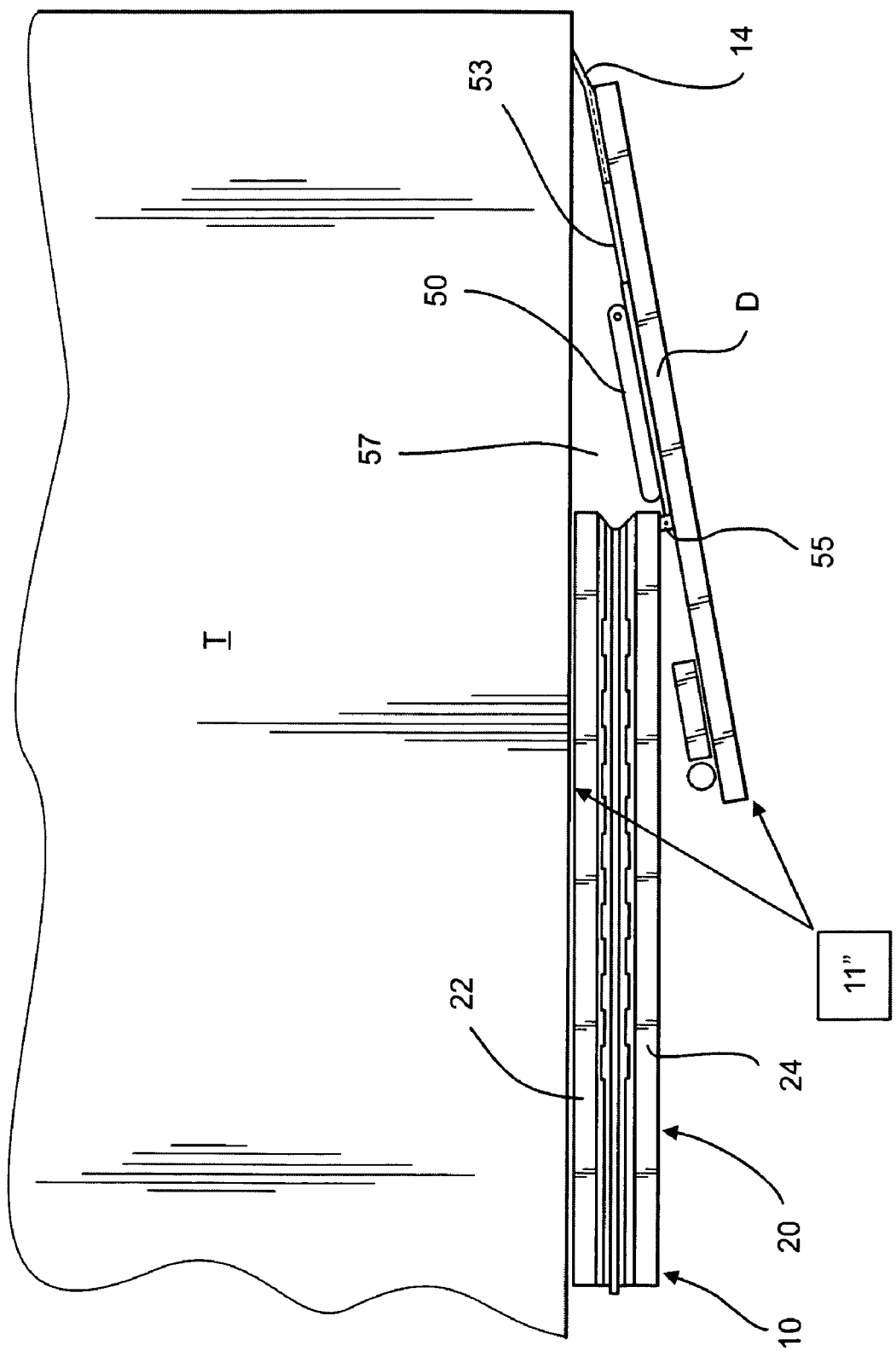
FIG. 15 is a top view of the drag reducing apparatus illustrated in FIGS. 11-14, shown with the apparatus in a stowed position with a trailer door opened at the rear of the trailer.

As further illustrated in FIG. 14 and in the overhead view of FIG. 15, the mounting frame 20 may be pivoted about the left side hinge array 28 so that the left side frame section 22 is flush with the side of the truck T. If the frame 20 simply pivots about the left side mounting hinges 28, the thickness of the folded apparatus 10 may impede the opening of the left side door D of the truck. Thus, the apparatus 10 contemplates a feature that moves the folded frame away from the hinges H of the truck door D. In this embodiment, the left side hinge array 28 includes extension hinges 50, as seen in FIGS. 14 and 15. The extension hinge 50 includes a fixed hinge 52 that is mounted to the truck T and a fixed plate 53 that is attached to the hinge 52. An extension plate 57 is slidingly mounted over the fixed plate 53 so that the plate 57 can be positioned adjacent the fixed hinge 52, as seen in FIG. 13, and then translated to the position shown in FIGS. 14-15 for stowing the apparatus 10. The extension plate 57 is attached to the frame 20 by a hinge 55, which allows the hinge assembly 50 to articulate in the manner necessary to move the apparatus from the operative to the stowed positions.

Figure 16:
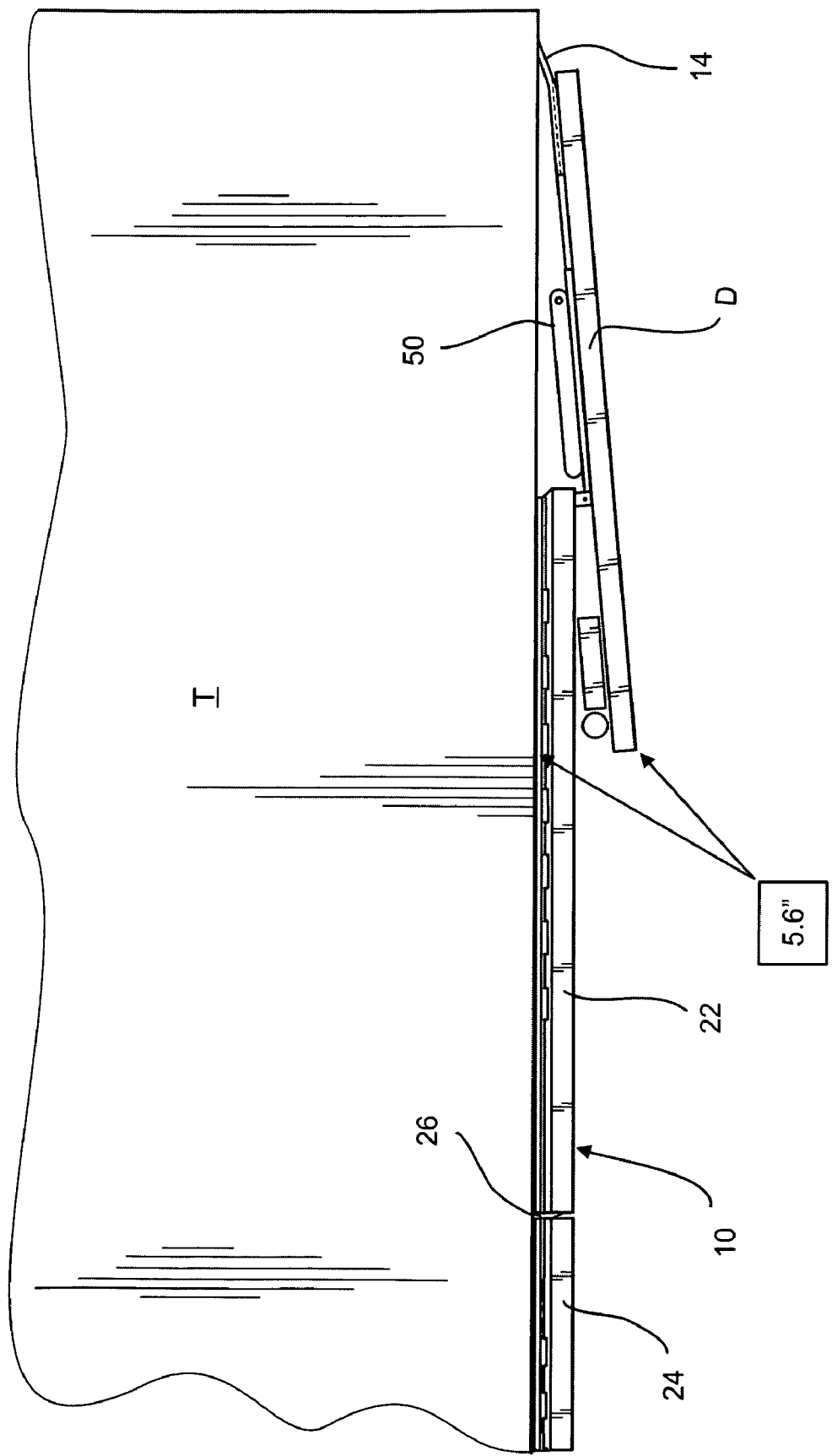
FIG. 16 is a top view of the drag reducing apparatus illustrated in FIGS. 11-14, shown with the apparatus in an alternative stowed position.

As shown in the overhead view of FIG. 15, the extension hinge 50 moves the folded apparatus 10 away from the hinges H of the truck door D to allow the door to be pivoted close to the side of the truck T and well clear of the rear of the truck. In the illustrated embodiment, the door D can be pivoted to within 11 inches of the truck side. If the right side frame section 24 is unfolded relative to the left section 22, as shown in FIG. 16, the stowed apparatus 10 sits flatter against the side of the truck so that the truck door D can be pivoted even closer to the truck. In the illustrated embodiment, the door D can be pivoted to within 5.6 inches.

One benefit of the frame system of the apparatus 10 is that it permits an intermediate storage position, and particularly the position shown in FIG. 12 in which the right side frame section 24 is folded onto the left side frame section 22, but before the folded frame is pivoted to the side of the trailer T. Thus, in this intermediate storage configuration the apparatus 10 is fully folded but remains situated at the rear of the trailer. The two frame sections 22 and 24 can be held together by a separate latch mechanism, by a bungee cord wrapped around the adjacent frame members, or by other suitable means for holding the sections together. A cover mounted to the exposed frame section 24 may also be provided to protect the panels from buffeting and from the elements. This intermediate storage position is particularly beneficial for intermodal applications in which a trailer box is carried by train or ship. Stowing the apparatus 10 at the side of the trailer box puts it at risk of damage as the containers are packed tightly next to each other. Moreover, the intermediate folded storage position of the apparatus reduces its exposure to the wind.

The intermediate storage position represented in FIG. 12 may also be used on the truck itself when the traveling speeds are not sufficient to obtain any aerodynamic benefit from the deployed apparatus. This alternative intermediate storage position keeps the apparatus at the rear of the truck to avoid any increase in drag by disrupting the side profile of the vehicle.

Figure 17:
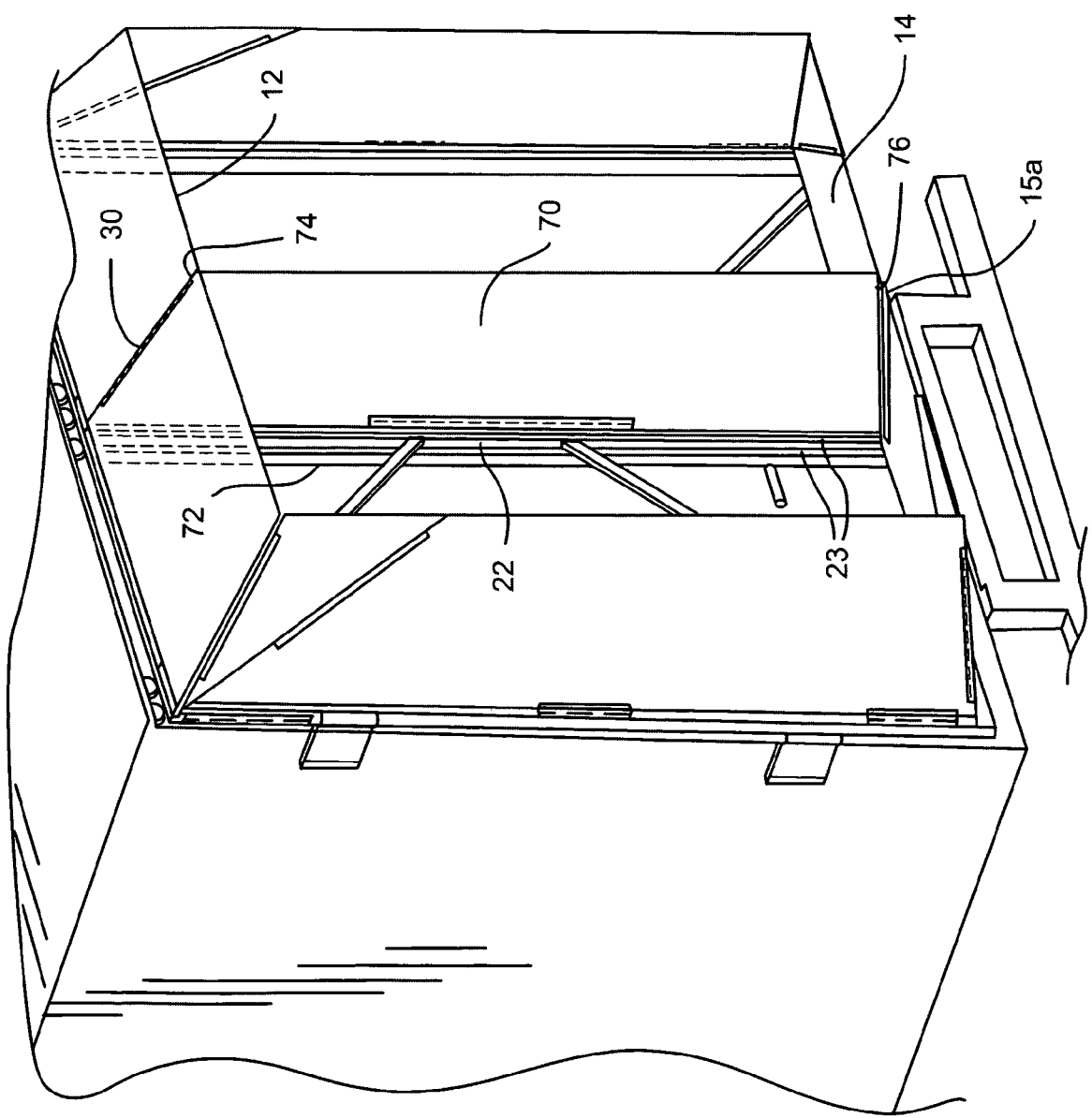
FIG. 17 is a perspective view of a modification to the drag reducing apparatus shown in the prior figures, with an additional interior panel shown in its stowed position.

The drag reducing apparatus 10 may be modified to incorporate an interior deployable panel, such as the panel 70 shown in FIG. 17. This panel 70 is supported on the frame 20 by a hinge 72 mounted to a frame member 23 of one of the frame sections, such as the left side frame section 22. The panel is initially folded flat against one of the doors D of the truck. After the drag reducing apparatus 10 is deployed, the interior panel 70 is free to pivot to its deployed position shown in FIG. 17. In this position, the upper edge 74 of the panel supports the deployed upper panel section 12 and the lower edge 76 rests against the lower panel section 14. In its deployed position, the panel 70 is aligned with the center hinges 13*a* and 15*a* of the respective panel sections. The panels and/or hinges may be configured to engage the interior panel 70 in its deployed state to hold the panel in position.

The interior panel thus provides support for and adds rigidity to the drag reducing apparatus. The interior panel 70 is particularly beneficial to allow the panels forming the apparatus to be as thin as possible. The interior panel helps maintain the apparatus in its drag reducing shape. It is contemplated in one embodiment that this interior panel 70 is provided with a apparatus 10 that is manually deployed. The operator thus deploys the apparatus 10 by moving one of the panels, as described above. Once the apparatus is open, the operator can then manually pivot the interior panel 70 outward until it is aligned with the center hinges 13*a*, 15*a*. Since the upper panel section 12 may dip slightly, some force may be required to pivot the interior panel fully to its deployed position. In an alternative embodiment, the interior panel 70 may be configured with a center panel, a top panel and a bottom panel hingedly connected together. The top panel is hingedly connected to one of the upper panels 12 while the bottom panel is connected to one of the lower panels 14 so that when the upper and lower panel sections 12, 14 deploy the interior panel is automatically deployed.

Figure 18:
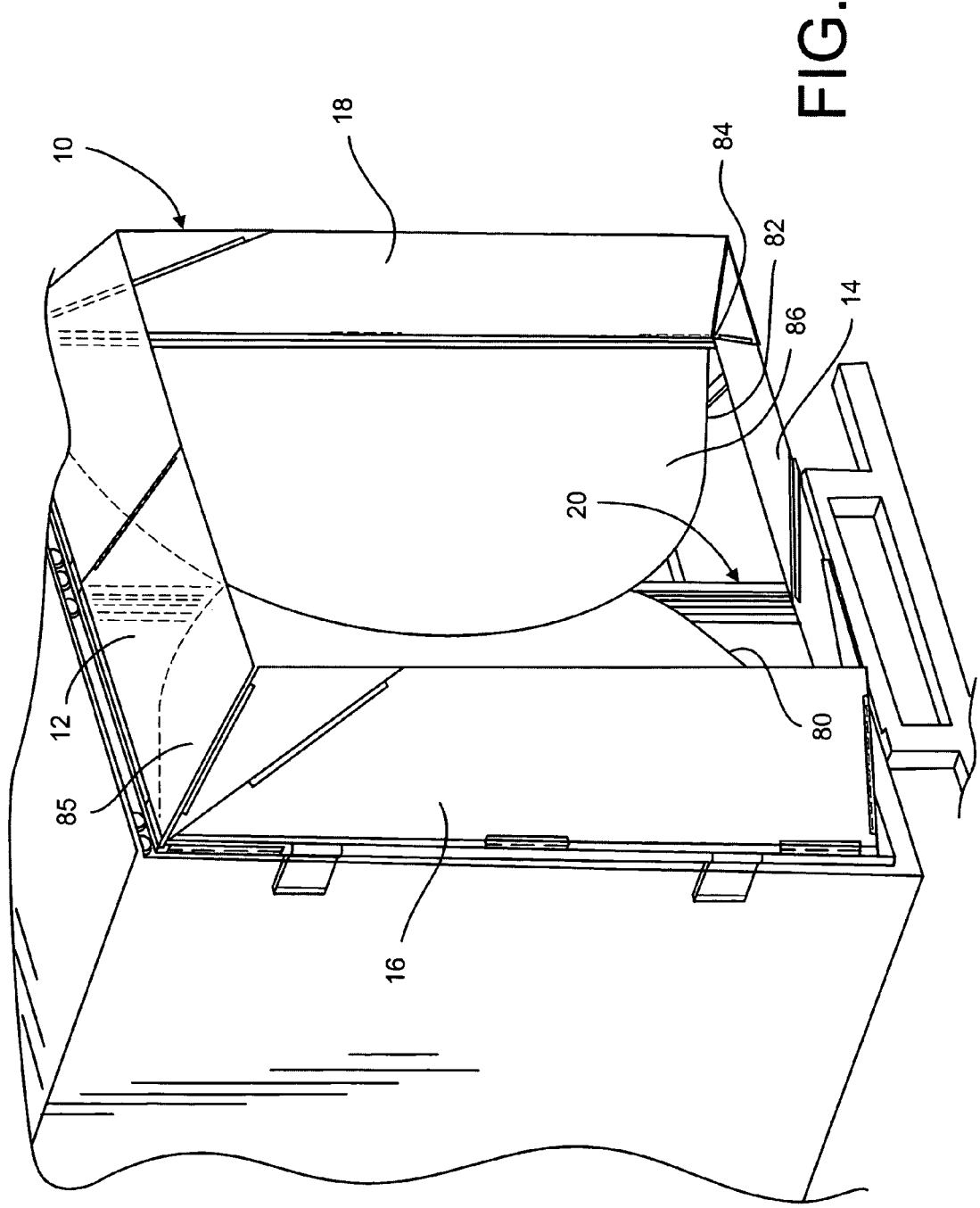
FIG. 18 is a perspective view of another modification to the drag reducing apparatus shown in the prior figures, with additional interior wings shown in their stowed position.
Figure 19:
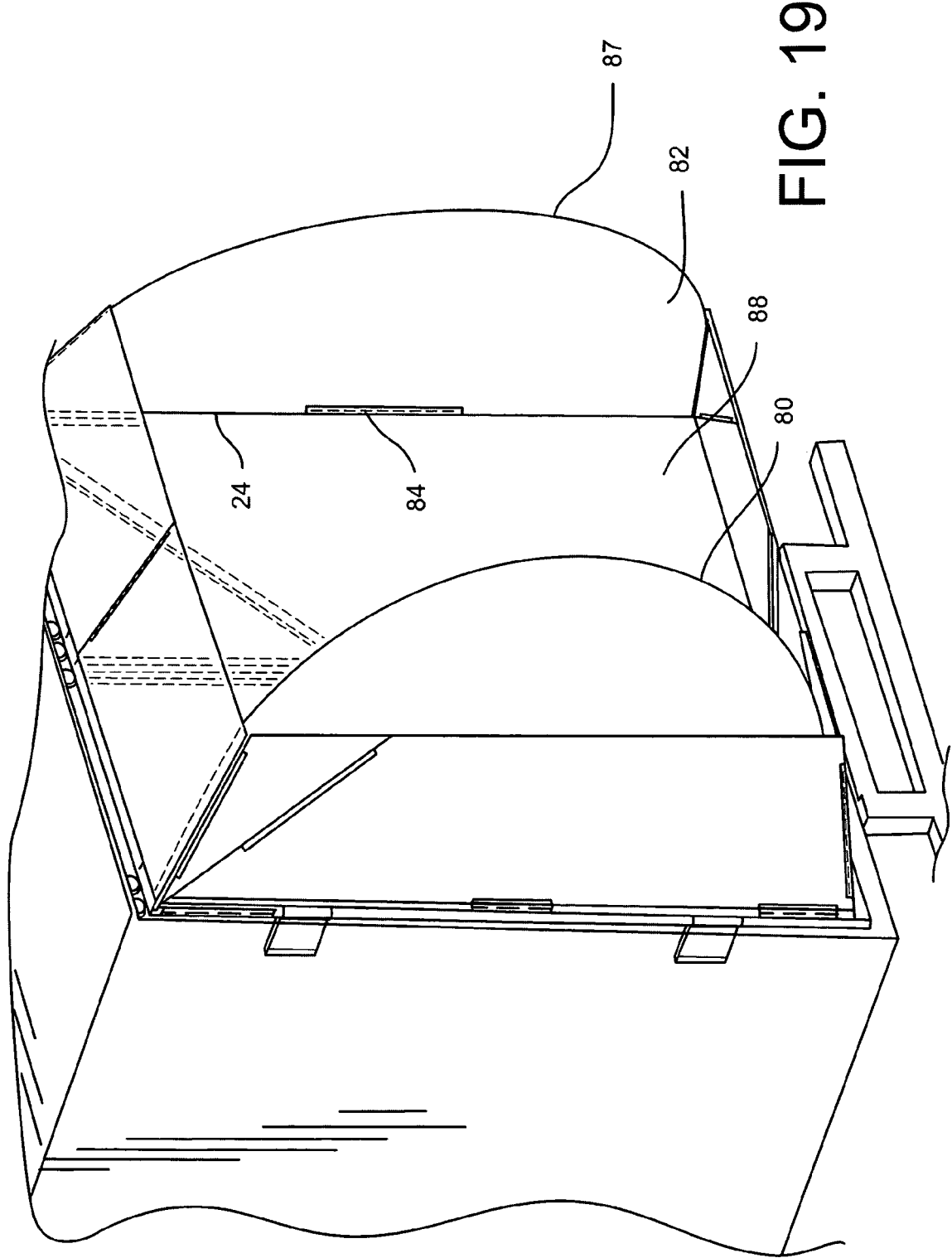
FIG. 19 is a perspective view of the drag reducing apparatus illustrated in FIG. 18, shown with the interior wings in their deployed position.

The embodiment shown in FIGS. 18-19 employs a similar concept, with the addition of interior wings 80, 82. Each wing is pivotably mounted to a corresponding frame section, such as section 24, of the frame 20 by a hinge, such as hinge 84 shown in FIG. 18. The wings are hingedly connected to the frame 20 immediately adjacent the hinge arrays 38, 40 for the side panels 16, 18, and may even be interleaved with those hinge arrays. As shown in FIG. 18, the wings 80, 82 are sized to overlap in their stowed configuration. The wings have a generally semi-circular shape with generally flat upper and lower edges 85, 86 to mate with the adjacent upper and lower panel sections 12, 14.

Like the interior panel 70 described above, the wings 80 and 82 remained stowed flat against the doors of the truck until the apparatus 10 is fully deployed. The wings may then be pivoted about their respective hinges until the wings 80, 82 are generally flush with the corresponding side panels 16, 18, as shown in FIG. 19. The semi-circular trailing edges 87 of the wings extend beyond the end of the panels in the apparatus 10 to increase the aerodynamic zone, or boat tail configuration, at the end of the truck. It can be appreciated that the wings 80, 82 provide an additional aerodynamic effect without having to increase the length of the hinged panel apparatus 10.

In one modification, a flexible sheet 88 is fixed between the two wings 80, 82. The sheet is formed of a thin but strong material, such as Mylar, that can be easily folded relatively flat when the wings are in their stowed position shown in FIG. 18. When the wings are deployed, the sheet 88 resembles a solid body appended to the rear of the vehicle to enhance the aerodynamic affect of the apparatus.

As shown in FIG. 19, when the wings 80, 82 are deployed, the side panels 16 and 18 are somewhat redundant. In one embodiment, the wings may be attached to the side panels in their deployed states. In another embodiment, the extent of the side panels 16, 18 can be reduced to the minimal width necessary to connect the upper and lower panel sections in order to retain the automatic folding and unfolding characteristic of the apparatus 10. In a further alternative, the side panels may be eliminated with appropriate modifications to the upper and lower panel sections 12, 14 and the wings 80, 82 to facilitate deployment and storage.

When deployed on a tractor-trailer rig, the drag reduction apparatus 10 significantly reduces drag, which has led to an increase in fuel economy and a commensurate decrease in fuel consumption. Computerized CFD analysis reveal reductions in vortices that ordinarily form at the upper edge of the trailer, coupled with a "reduction" drag-generating negative pressure at the rear of the trailer. In the illustrated embodiment, the panel sections 12, 14, 16 and 18 are configured to assume about a 15 degree angle relative to the horizontal and vertical planes of the trailer walls. The panel sections are approximately 30 inches in length. With this configuration, the CFD analysis predicts a reduction in total drag of about 8% from a standard trailer without the apparatus 10.

In this CFD analysis it was noted that a low pressure region is created in the gap between the apparatus 10 and the rear of the trailer. In one approach, a sealing strip may be positioned within the gap. The strip may be in the form of a rubber or elastomeric seal affixed to the rear perimeter of the frame 20. The seal compresses against the rear of the trailer T when the apparatus 10 is mounted.

Figure 20:
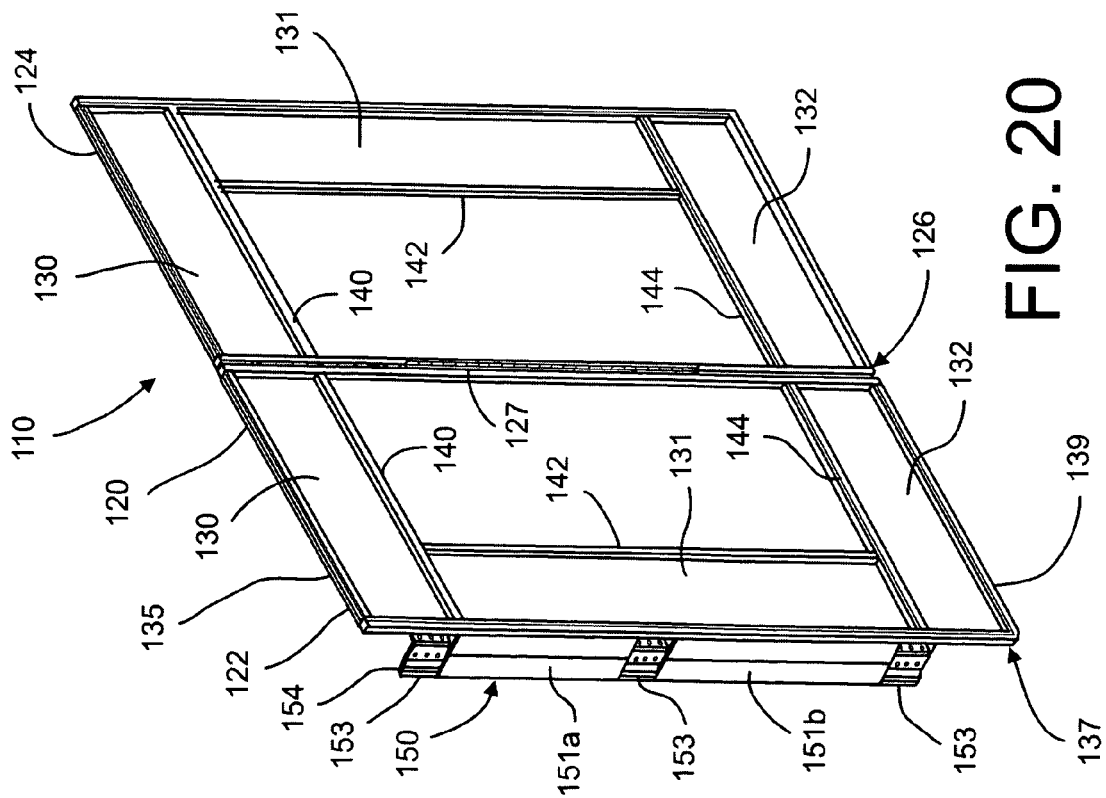
FIG. 20 is a rear perspective view of the mounting frame for a drag reduction apparatus according to a further embodiment.
Figure 21:
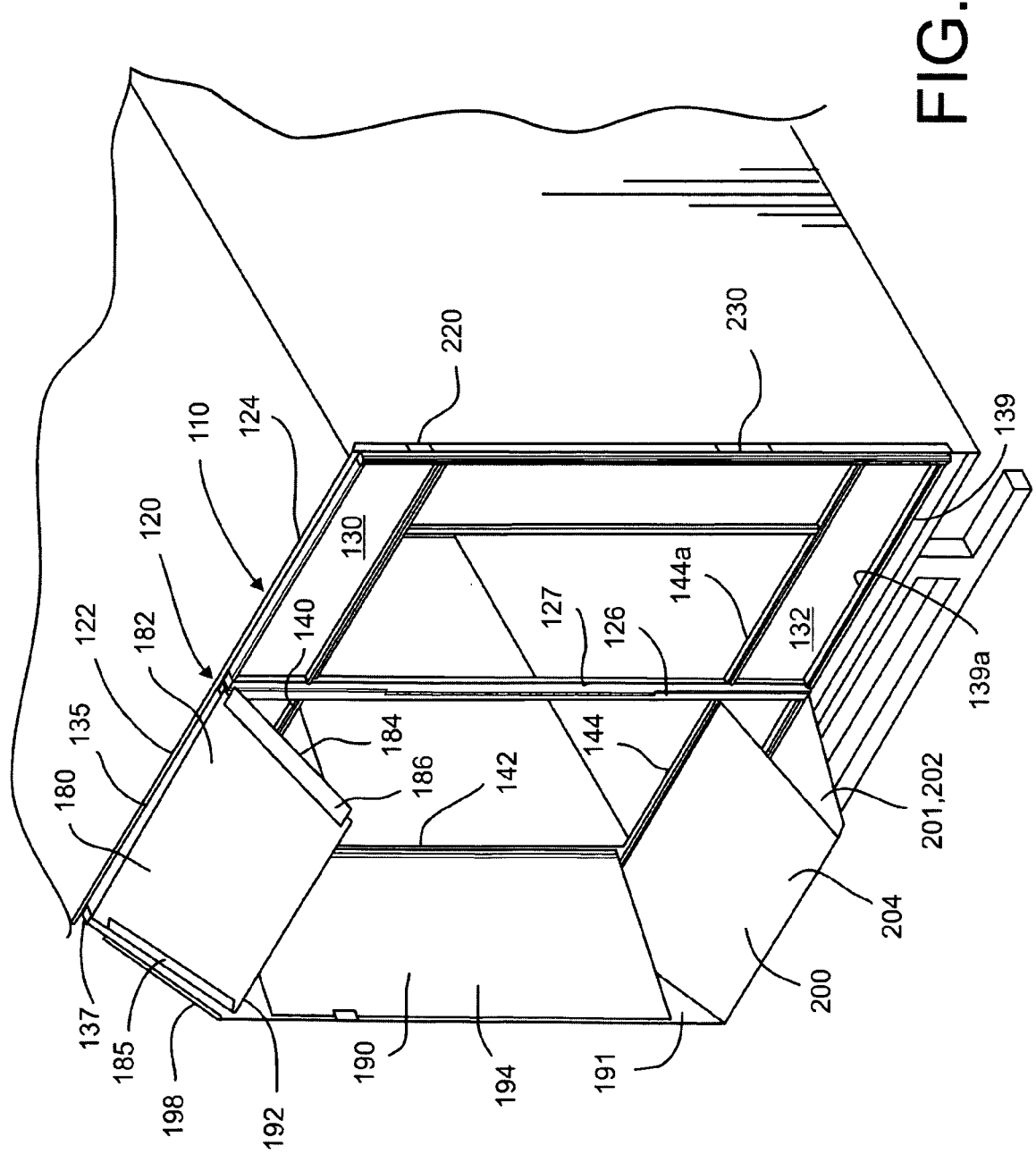
FIG. 21 is a right rear perspective view of a drag reduction apparatus according to the further embodiment mounted on the rear of a trailer, with a portion of the apparatus removed for clarity.
Figure 22:
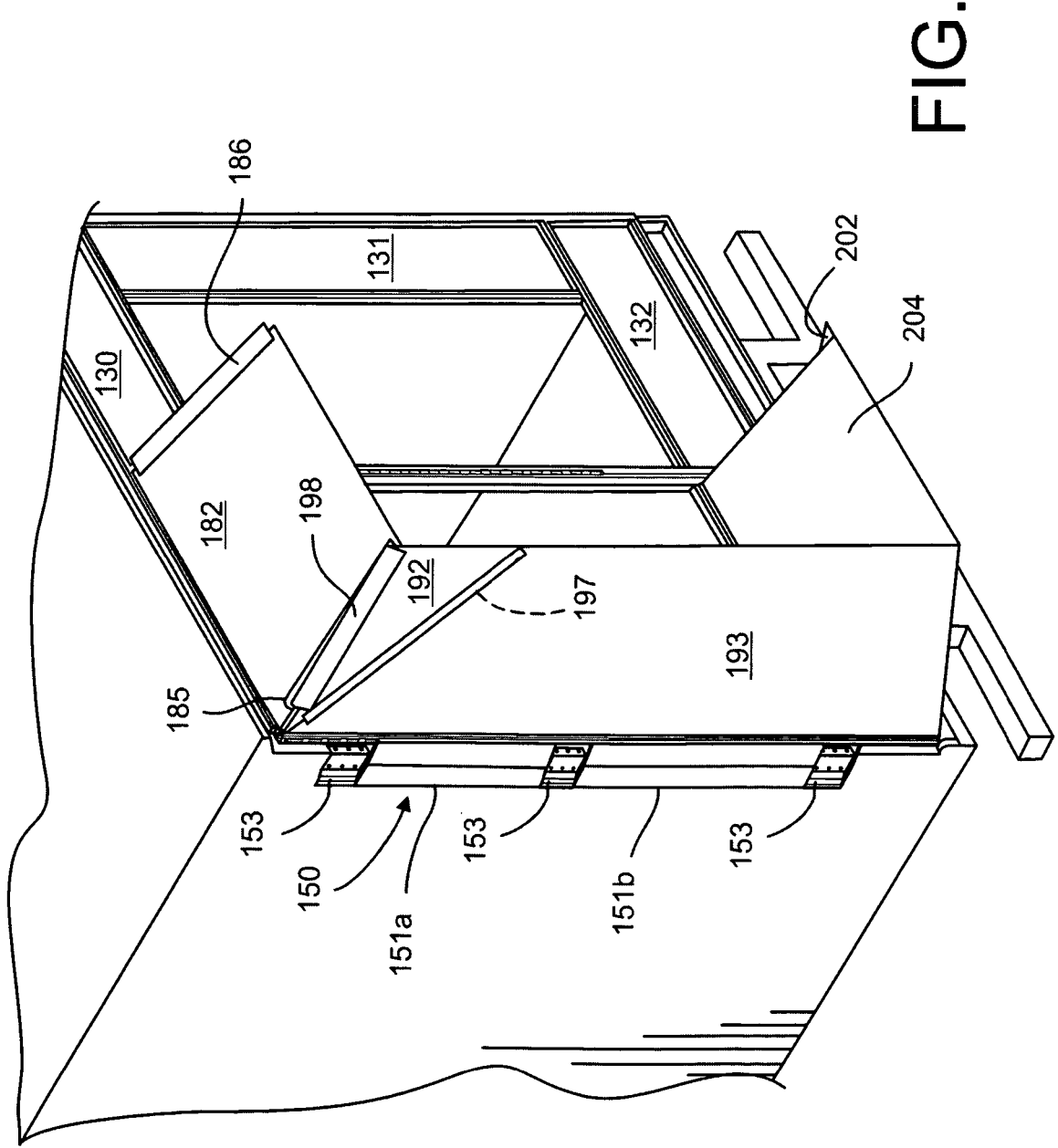
FIG. 22 is a left rear perspective view of the drag reduction apparatus shown in FIG. 21, with a portion of the apparatus removed for clarity.

In an alternative approach, the gap is left open but the mounting frame is modified, such as the frame 120 of the alternative drag reducing apparatus 110 shown in FIGS. 20-22. The frame 120 is similar to the frame 20 described above with the inclusion of left and right side mounting frame sections 122, 124 connected at their center beams 126 by a hinge element 127. The perimeter of the frame 120 is defined at each frame section by an upper extrusion or beam 135, a side extrusion or beam 137 and a lower extrusion or beam 139, details of which are discussed below. Unlike the mounting frame of the prior embodiments, the frame 120 includes upper, side and lower interior extrusions 140, 142 and 144, respectively, that are offset from the perimeter frame extrusions, as shown in FIG. 20. The spaces between the perimeter and the interior extrusions are spanned by upper, side and lower plates 130, 131 and 132, respectively. The central portion of the frame 120 between the interior extrusions remains open. It has been found in CFD analysis that these interior panels offset or cancels the forces resulting from air flow through the gap between the trailer T and the apparatus.

In a further feature of this embodiment, the panel sections are augmented by tether sheets, as shown in FIGS. 21-22. As in the prior embodiment, the apparatus 110 includes upper, side and lower panel sections 180, 190 and 200 that fold and unfold in the same manner. In FIGS. 21-22 only the left side sections are shown, it being understood that the right side panel sections are similarly configured. The panel sections include an upper panel 182, side panels 192 and 194, and lower panels 201 and 202. The upper panel section 180 further includes an upper tether sheet 184 that is connected at its inboard edge to the upper interior extrusion 140 and at its outboard edge to the upper panel 182. Likewise, the side panel section 190 includes a side tether sheet 194 connected between the side panel 193 and the side interior extrusion 142, while the lower panel section 200 includes a lower tether sheet 204 connected to the lower panel 202 and the lower interior extrusion 144.

The tether sheets serve to control the outward or unfolded position of the panel sections. It is contemplated in one aspect that the tether sheets may be configured to achieve a predetermined unfolded shape of a corresponding panel For instance, the side tether sheet 194 may be configured to introduce a slight vertical curvature to the side panel 193. The panels are preferably formed of a flexible material that would allow their shape to be contoured using the restraint of the tether sheet.

An important objective of the tether sheets is to improve the drag reduction performance of the apparatus 110. In CFD analysis it has been found that introducing the tether sheets as depicted in FIGS. 21-22 leads to an 11% reduction in aerodynamic drag from the bare trailer. This is in comparison to the 8% reduction achieved by the apparatus 10 described above. In the analyzed embodiment, the panels are oriented at the 15 degree angle described above. The tether sheets are also oriented at a 15 degree angle so that the tether sheets and associated panels together define a subtended angle of about 30 degrees.

A further benefit of the lower tether sheet 204 is that the slope of the sheet helps shed rain, snow and debris that may fall or be sucked into the interior of the deployed apparatus 110. Thus, in one embodiment, the lower tether sheet is formed of a solid or close knit fabric material. The sheet may also be treated with a waterproofing composition. However, the upper sheet 184 and side tether sheet 194 need not be formed of the same material. It has been found that forming these tether sheets of a mesh material achieves substantially the same drag reduction benefit as a more solid material. The use of the mesh material in the upper and side locations means a lighter tether sheet that will not impede the folding or unfolding of the apparatus 110.

Figure 23:
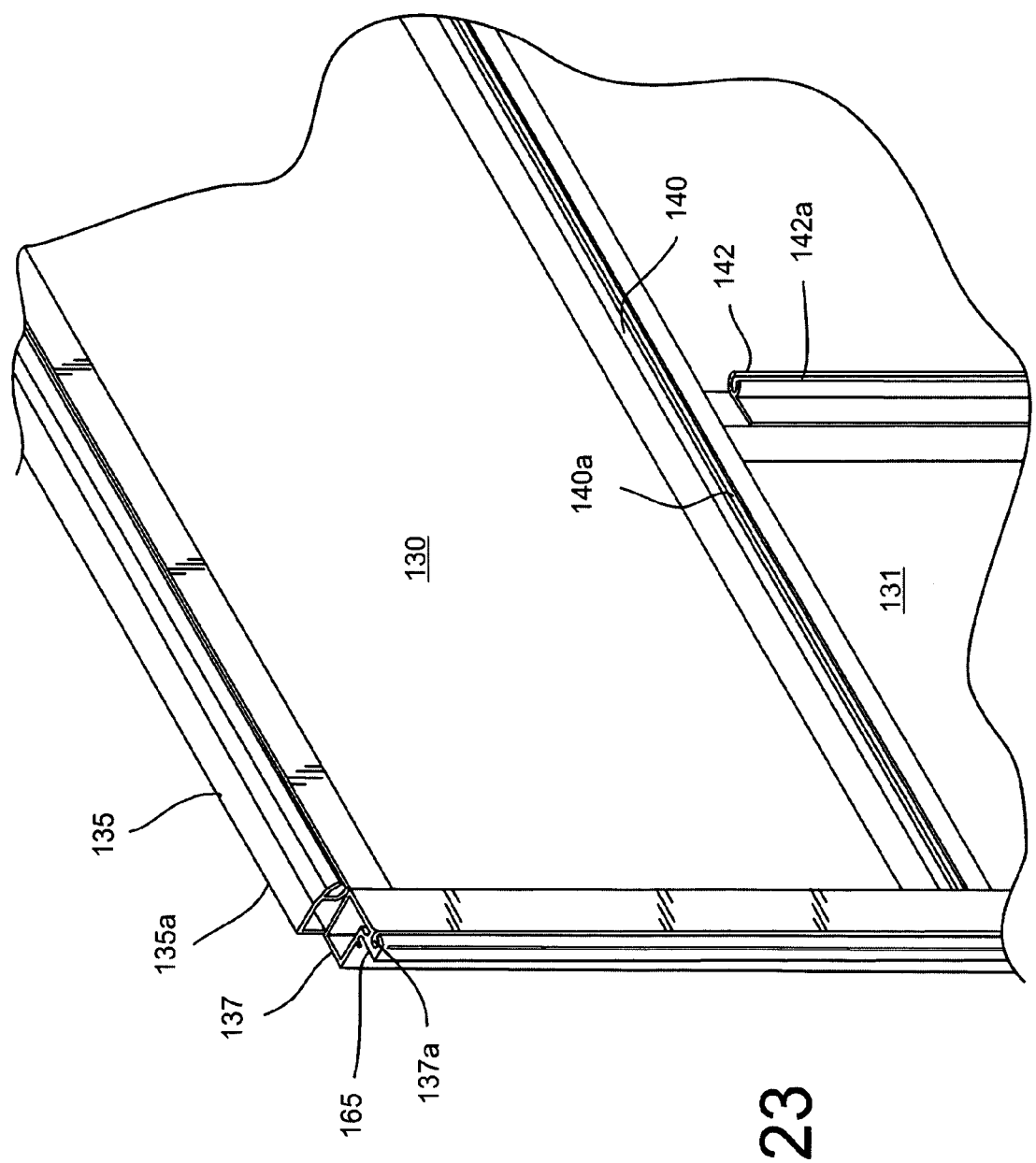
FIG. 23 is an enlarged perspective view of a portion of the mounting frame shown in FIG. 20.

As indicated above, the frame elements are in the form of extrusions. As shown in FIG. 23, these extrusions define interlocking channels that are used for the connection of the panels and tether sheets to the frame. Thus, the upper extrusion 135 defines a interlocking channel 135a, the side extrusion 137 a channel 137a, and the lower extrusion 139 a channel 139a. Likewise, the interior extrusions define corresponding interlocking channels 140a, 142a and 144a, as shown in FIGS. 21 and 23.

The panel sections 180, 190 and 200 are configured to engage the interlocking channels. Thus, as shown in FIGS. 24a-b, the upper panel section 180 includes an engagement rib 188 affixed to the interior edge of the upper panel 182. The rib is sized to slide into one end of the interlocking channel 135a when the upper panel is installed. The upper tether sheet 184 includes a similar rib 189 that is configured to slide into the channel 140a. The interlocking channel and rib may be configured with a circular cross-section, a T-slot/T-bar configuration, or any other mating interface that allows the rib to be slid into an open of the channel and hold the end of the panel or sheet. As shown in FIGS. 25-26, the panels and tether sheets of the side and lower panel sections 190 and 200, include similar ribs 216, 218 (side panel) and 210, 214 (lower panel) that engage the corresponding channels. It can be noted from FIGS. 25-26 that the triangular panels 192 and 202 do not require a rib because no edge of these panels engages a interlocking channel.

It can thus be appreciated that the panels 182, 193 and 201 are configured to be removed and replaced independent of the other panels. This same independent replaceability is also incorporated into the tether sheets 184, 194 and 204. In order to fully capitalize on the modularity and ready removal/replacement of the panels, the drag reduction apparatus 110 incorporates additional features for the connection of adjacent panels. In particular, referring first to FIG. 24a, the upper tether sheet 184 may be fastened by a tape strip 183 to the outboard edge of the upper panel 182. The upper panel 182 further includes a tape strip 186 extending alone an inboard side edge of the panel. This tape strip 186 is fastened to the complementary right side upper panel that forms the entire upper panel section 180 spanning the width of the apparatus frame 120. The tape strip 186 thus acts as a hinge at the joint between the two upper panels that allow the upper panels to fold with the frame 120 when the apparatus 110 is to be pivoted clear of the trailer doors, as illustrated in FIG. 14, for instance. The tape preferably incorporates sufficient rigidity so that the combined upper panels do not bow at the center joint. Thus, the tape strip 186 may be a heavy duty vinyl tape.

The opposite side edge of the upper panel 182 interfaces with the upper triangular panel 192 as seen in FIG. 22. To preserver the modularity of the panel construct, the upper panel 182 includes a removable fastener strip 185 at the edge adjacent the triangular panel 192. As shown in FIG. 25a, the upper triangular panel 192 of the side panel section 190 includes a mating removable fastener strip 198 extending from its free upper edge. As seen in FIG. 21, the two mating strips 185, 198 are initially separated but may be connected by overlaying the strip 198 onto the strip 185. In one specific embodiment, this strip 185 may incorporate a hook-and-loop fastener arrangement. However, other non-permanent, easily removable fastener elements may be used that do not require a tool to remove, such as a zipper, snaps or other components provided they are sufficiently strong to hold the panels together under high wind and vibration conditions experienced by the apparatus 110.

In FIG. 25 it can be seen that the side panel 191 includes a removable fastener strip 196 at its lower edge that is used to connect the side panel to the lower triangular panel 202 shown in FIG. 26. The lower triangular panel 202 thus includes its own removable strip 208 so that the two strips 202 and 208 mate in the same way as the removable strips 185, 198. In the illustrated embodiment, the upper triangular panel 192 is fastened to the side panel 191 using a heavy duty tape strip 197. Similarly, the lower triangular panel 202 is fastened to the lower panel 201 by a tape strip 206 and the left and right lower panels are attached by a tape strip 207. It can be appreciated that full modularity can be achieved by replacing all of the tape strips with a removable fastener strip, configured like the strips 196 and 208. In particular, the strips 186 and 207 used to attach the left and right sides of the upper and lower panel sections may incorporate a removable fastener strip. However, it is preferred that the tape strips be utilized at the joints between panels that are intended to reside in a mutual plane when the apparatus 110 is deployed to avoid sagging or misalignment of a particular panel section 180, 190, 200.

Figure 28:
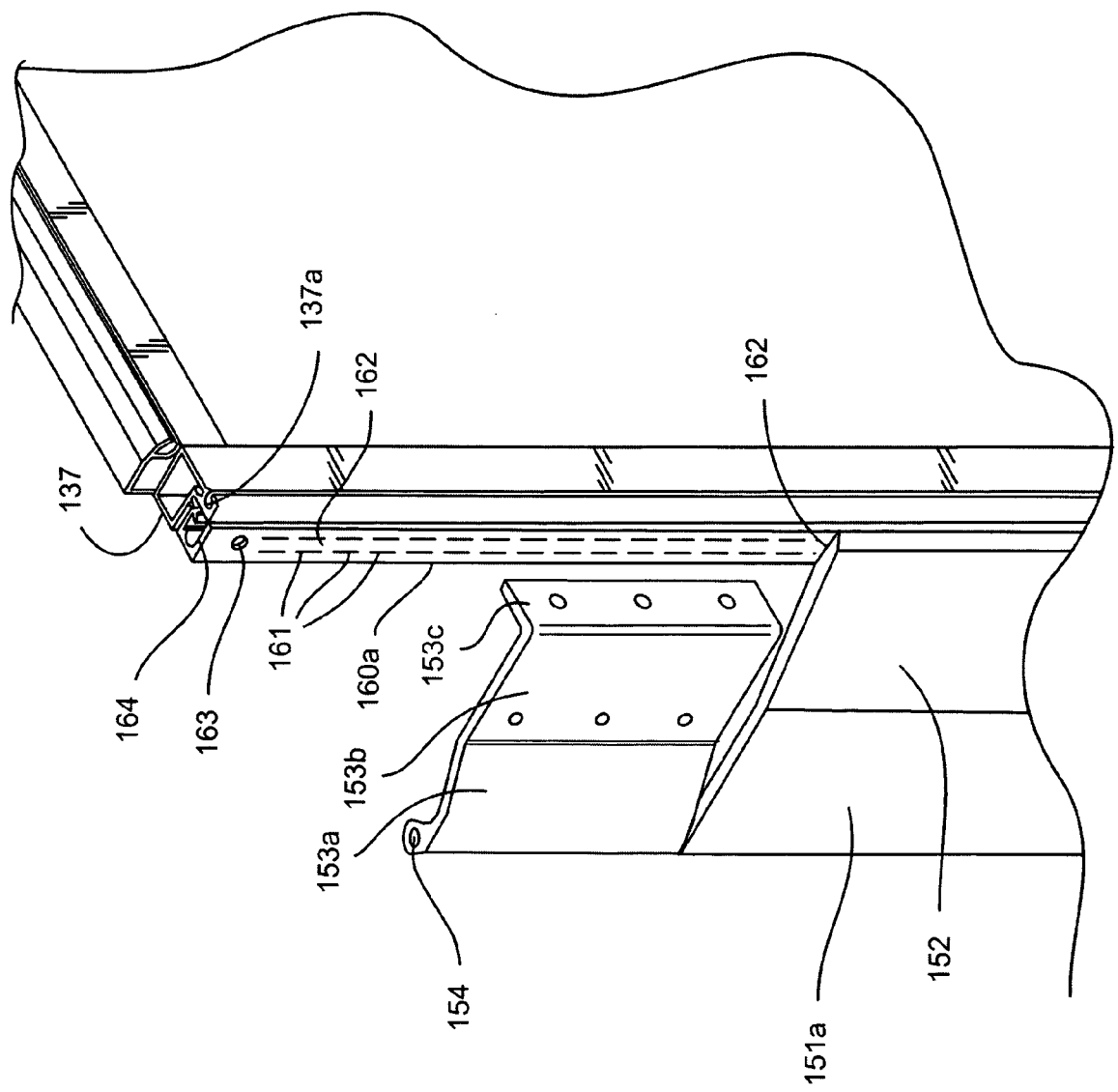
FIG. 28 is an enlarged perspective view of the interface between the hinge assembly of FIG. 27 and the mounting frame of FIG. 20.
Figure 29:
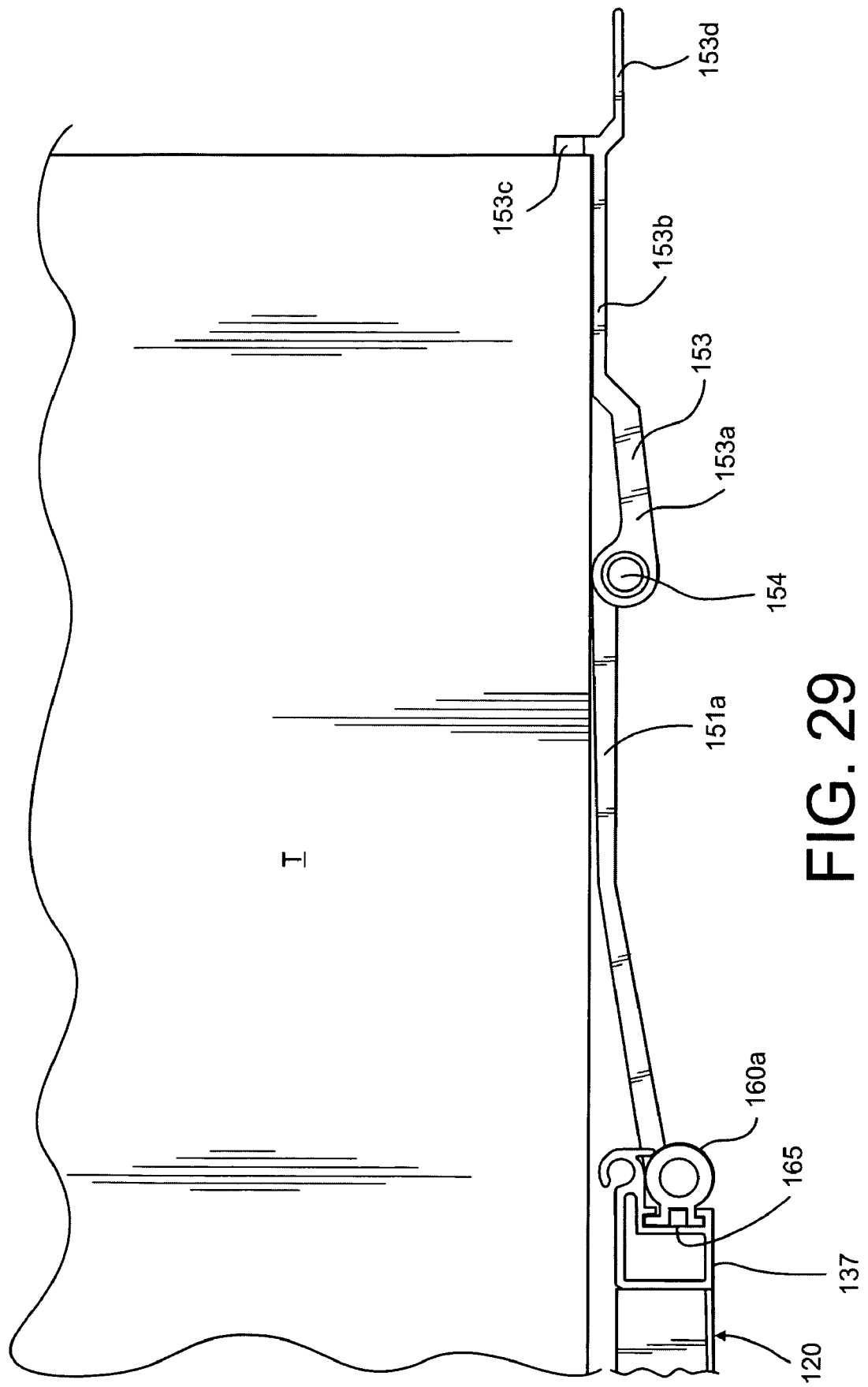
FIG. 29 is a top view of the hinge assembly depicted in FIGS. 27-28, with the hinge assembly in the extended or open position relative to the trailer.

This modularity feature of the apparatus 110 extends to the hinge arrangement that connects the apparatus to the body of the trailer T. Referring back to FIG. 20, the frame 120 includes a hinge assembly 150 that includes a pair of hinge elements 151a, 151b connected to the frame 120 and a plurality of fixed hinges 153 that are fastened to the trailer T, as shown in FIG. 22. The hinge elements 151a, 151b are pivotably connected to the fixed hinges 153 by a pivot rod 154 extending through mating bores in the components. In one embodiment the fixed hinges 153 include a pivot plate 153a that defines the bore to receive the pivot rod 154, as shown in FIG. 28, and two right angle plates 153b and 153c that are fastened directly to the body of the trailer using convention fasteners, such as screws or bolts. The right angle plates and particularly the plate 153b are configured to rest flush against the side of the trailer. It can be appreciated that the fixed hinges 153 offset the pivot point for the hinge elements 151a, 151b—i.e., the pivot rod 154—forward relative to the back of the trailer. This pivot point offset allows the frame 120 to be pivoted clear of the rear of the trailer and close to the side of the trailer to avoid impeding the opening of the trailer door D, as can be seen in FIG. 29.

The fixed hinges may angle outward away from the trailer body to the pivot plate 153a. As shown in FIG. 29, this configuration provides an aerodynamic shape to the fixed hinge. Moreover, this configuration ensures that the fixed hinge 153 has a minimal profile that does not interfere with trailer door D when the door is opened and pivoted on its own hinges against the side of the trailer. An optional element is also depicted in FIG. 29, namely an extension plate 153d that bridges the gap between the trailer body and the apparatus frame 120.

Figure 27:
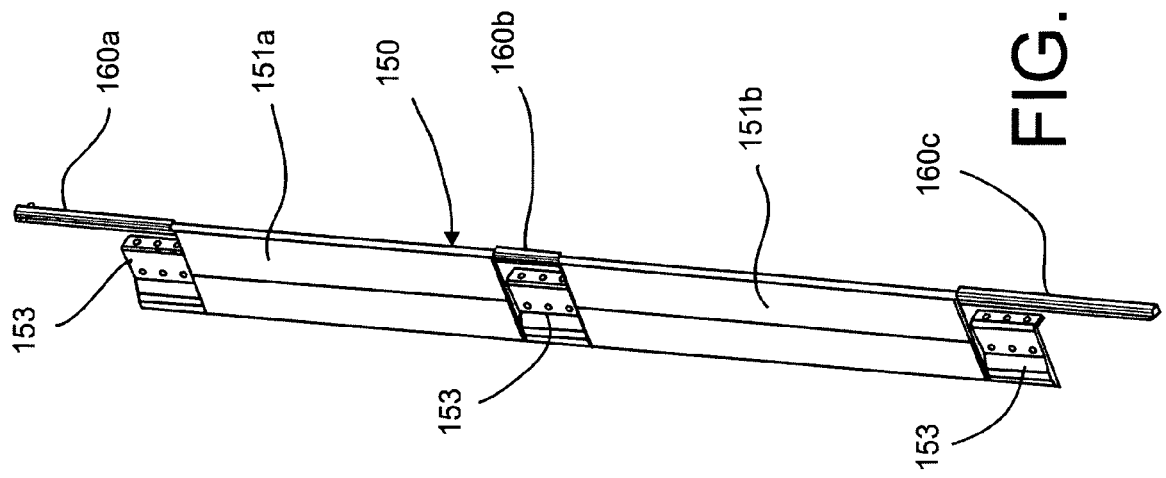
FIG. 27 is a perspective view of a hinge assembly of the mounting frame shown in FIGS. 20-22.

The manner in which the hinge assembly 150 engages the frame 120 is shown in FIGS. 27 and 28. In the illustrated embodiment, the hinge assembly includes two hinge plates 151a and 151b. To accommodate different door hinge locations on the trailer, the hinge plate will typically have different lengths—in FIG. 27 the hinge plate 151b is longer than the hinge plate 151a. The hinge assembly thus includes hinge spacer extrusions 160a, 160b and 160c that interface with the side extrusion 137, as shown in FIG. 28. In one embodiment, the side extrusion 137 includes an interlocking channel 165 that extends along its entire length. The channel 165 is configured for a sliding fit with an interlocking element 164 on each hinge spacer extrusion 160. Each hinge spacer extrusion defines a bore 161 through which a pivot rod 162 extends. The pivot rod passes through the bore 161 in each of the hinge spacer extrusions 160a, 160b, 160c and an aligned bore in the hinge plates 151a, 151b. It can be appreciated that the hinge spacer extrusions may be sized as dictated by the trailer door hinge placement and by the optimal locations for attaching the fixed hinges 153 to the trailer T. The upper and lower spacer extrusions may be provided with a fastener bore 163 that can be used to fasten the spacer extrusion to the side extrusion 137 of the apparatus frame 120. Thus, the interlocking arrangement between the interlocking element 164 and channel 165, coupled with the fasteners through bores 163 ensure a solid engagement of the hinge assembly 150 to the frame. The same fastener can also trap the pivot rod 162 within the bores 161.

Figure 30:
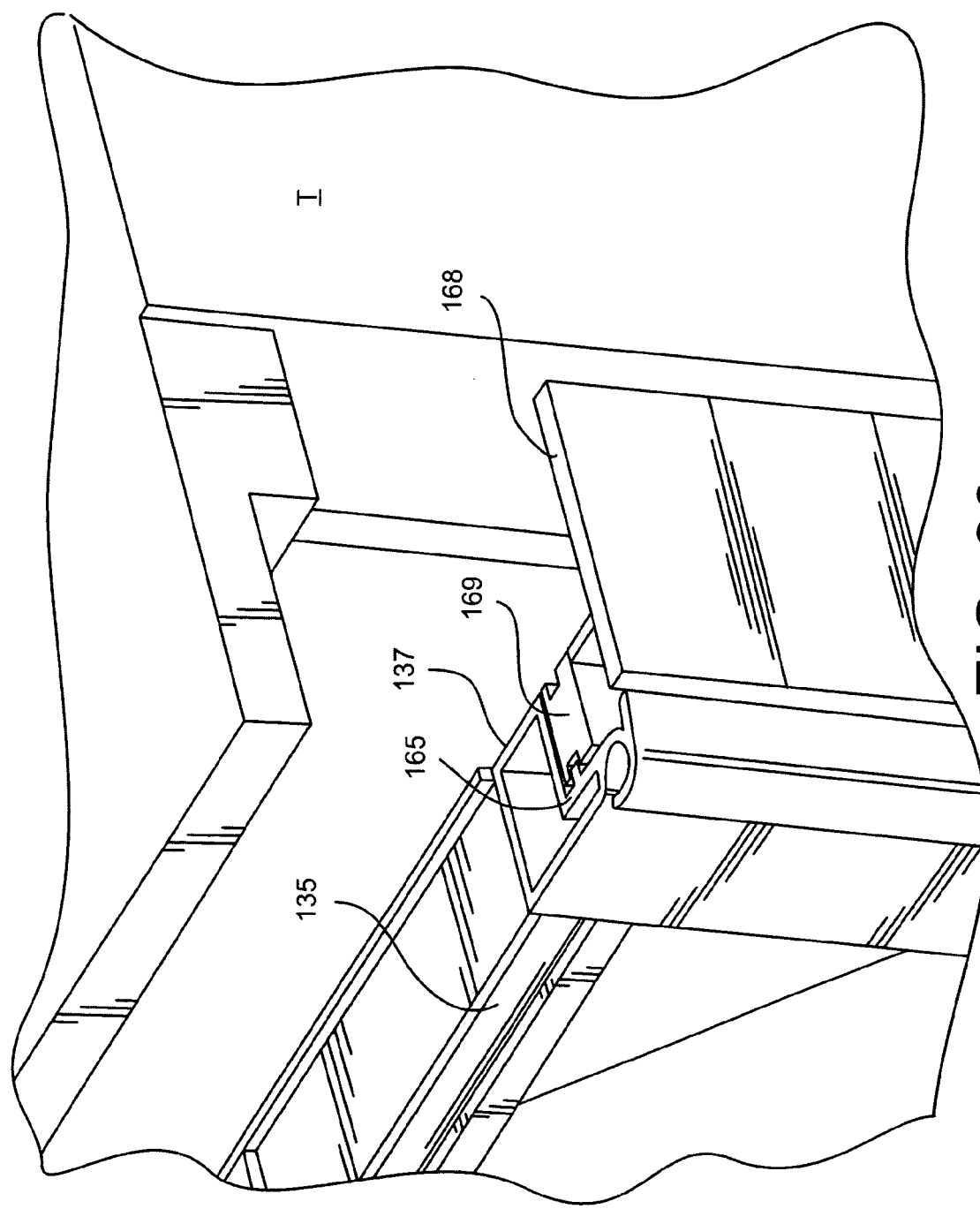
FIG. 30 is an enlarged perspective view of a sealing element mounted to the mounting frame of FIG. 20.

The drag reduction apparatus 110 only requires one hinge assembly 150 on either the right or left side of the frame 120. However, the same side extrusion may be used on both the hinged and the non-hinged side. The channel 165 of the extrusion on the non-hinged side may be used to mount a sealing element 168, as shown in FIG. 30. The sealing element thus includes a mating element 169 that slidably interlocks with the channel 165 to permit easy installation or removal of the sealing element. The sealing element is preferably sized to fill the gap between the trailer and the frame and may be formed of a flexible material, such as rubber.

The non-hinged side of the apparatus 110 includes components that fasten the free end of the frame 120 to the trailer T. In one embodiment, these components include a latch plate 220 that is fastened to the trailer and extends downward at about a 45 degree angle. The latch plate is configured to be received in a latch receptacle 222 attached to the frame 120, as illustrated in FIG. 31. The receptacle preferably includes an angled lower surface 223 that is complementary with the latch plate 220. When the frame is locked to the trailer, an upward movement of the frame moves the receptacle to the latch plate. As the angled plate contacts the angle surface 223 this contact draws the frame 120 closer to the trailer T.

As shown in FIG. 31, the second component for locking the apparatus to the trailer includes a latch post 225 projecting outward from the trailer. A latch assembly 230 is mounted to the frame 120 for engaging the latch post and positively locking the frame to the trailer. Details of the latch assembly are shown in FIGS. 32-33. The latch assembly includes a base plate 232 that is attached to the back of the frame 120 on the side opposite the hinge assembly 150 and in alignment with the latch post 225. A handle 234 is pivotably mounted to the base 232 at a pivot mount 238. This pivot point is close to the working end of the handle that engages the latch post, namely the catch slot 236. The greater length of the handle is manipulated by the operator and provides a mechanical advantage when engaging the latch post with the latch slot. The latch slot 236 is contoured to draw the latch assembly 230 upward, which thereby draws the entire frame 120 upward. This movement moves the latch receptacle 222 at the upper portion of the frame into engagement with the latch plate 220, as described above.

The handle 234 is pivoted in one direction to engage the latch post within the latch slot and in the opposite direction to disengage. The latch assembly 230 includes a mechanism for locking the handle in the engaged configuration until deliberately released. Thus, the assembly includes a release lever 250 that defines a catch notch 252 adapted to engage a tang 254 projecting from the latch base plate 232. The tang 254 includes a projection 254a that serves as a stop for the handle 234 in its engaged position. As seen best in FIG. 33, the tang 254 is disposed within the catch notch 252 to lock the latch assembly in its engaged position.

Figure 34C:
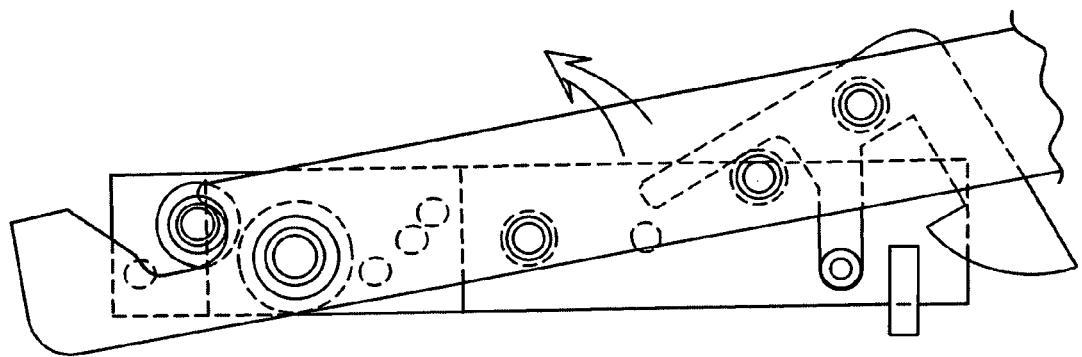
FIGS. 34a-c are side views of the latch assembly shown in FIGS. 32-33, depicting stages of operation of the assembly.
Figure 34B:
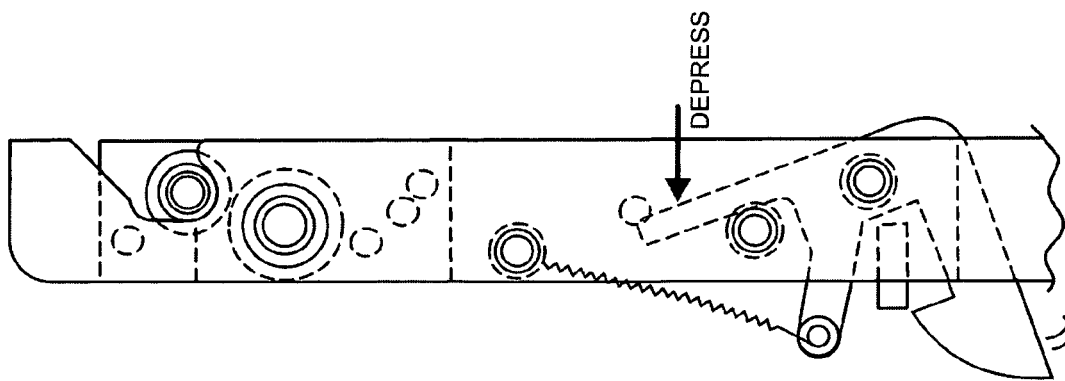
Figure 34A:
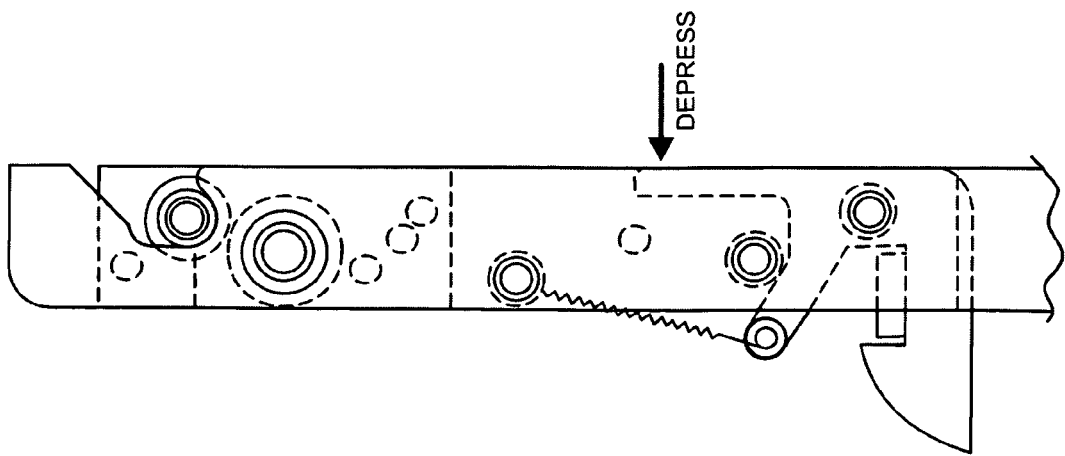

The release lever 250 is pivotably mounted to handle 234 at a pivot mount 262. The release lever includes a biasing arm 256 on the opposite side of the pivot mount from the catch notch 252. This biasing arm maintains the release lever in the locked position until manually released by the operator. Thus, the biasing arm 256 bears against a roll pin 240 projecting from the handle 234. A biasing spring is connected from the free end of the biasing arm 256 to a spring mount 260 on the handle. The spring is calibrated to pull the release lever 252 against the roll pin 240, which thereby produces a moment at the catch notch 252 to keep it in engagement with the tang 254. The biasing arm may be released by depressing the push pad 264 which pivots the release lever 250 about the pivot mount 262, against the force of the spring 258, to free the notch 252 from the tang 254. Once the release lever 250 has been disengaged from the tang the handle is free to pivot in a direction to disengage the catch slot 236 from the latch post 225. This sequence of operation is depicted in FIGS. 34a-c.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in the disclosed embodiments the folding panels are described as mounted to a frame that is itself mounted to the vehicle. Alternatively, the folding panels may be mounted directly to the rear of the vehicle, such as to the rear door(s) of the vehicle. The panels of drag reducing apparatus in this alternative are configured to swing with the door(s) of the vehicle.

What is claimed is:

1. A drag reducing apparatus for a vehicle, comprising:
an upper panel section, a lower panel section and opposite side panel sections, each of said panel sections mounted by a hinged connection around a perimeter of the rear of the vehicle, said upper panel section hingedly connected to an upper end of each of said side panel sections and said lower panel section hingedly connected to a lower end of each of said side panel sections;
said panel sections having a folded state in which each panel section is substantially flat with said side panel sections overlying said lower panel section and said upper panel section overlying said side panel sections; and
the hinged connections between panel sections are configured so that said panel sections automatically move from said folded state to an extended state at an airflow around the rear of the vehicle sufficient to pivot said upper panel section upward from said folded state.

2. The drag reducing apparatus of claim 1, wherein each side panel section includes a side panel and a triangular panel hingedly connected to said side panel to overlie said side panel in said folded state, said side panel including said lower end hingedly connected to said lower panel section and said triangular panel including said upper end hingedly connected to said upper panel section.

3. The drag reducing apparatus of claim 2, wherein said triangular panel of each side panel section is sized to be completely overlapped by said upper panel section when said panel sections are in said folded state.

4. The drag reducing apparatus of claim 2, wherein said triangular panel and said side panel of each side panel section is configured to be substantially planar in said extended state.

5. The drag reducing apparatus of claim 1, wherein said lower panel section includes an elongated lower panel and a triangular panel hingedly connected to each end of said lower panel to overlie said lower panel in said folded state, each triangular panel hingedly connected to said lower end of a corresponding side panel.

6. The drag reducing apparatus of claim 5, wherein each triangular panel and said lower panel are configured to be substantially planar in said extended state.

7. The drag reducing apparatus of claim 1, wherein said upper panel section and said lower panel section include a center hinge arrangement configured to permit one side panel section to be pivoted to overlap the other side panel section in the folded state.

8. The drag reducing apparatus of claim 1, wherein the hinged connections between panel sections are configured so that each of said panel sections is oriented at an angle of about 15 degrees relative to a perpendicular plane extending from the rear of the vehicle in said extended state.

9. The drag reducing apparatus of claim 1, wherein the hinged connections between panel sections include a removable fastener strip for removably connecting said panel sections.

10. The drag reducing apparatus of claim 9, wherein said removable fastener strip includes a hook-and-loop fastener.

11. A drag reducing apparatus for a vehicle, comprising:
a frame having a perimeter and opposite side sections;
an upper panel section, a lower panel section and opposite side panel sections, each of said panel sections hingedly connected around said perimeter of said frame, said upper panel section hingedly connected to an upper end of each of said side panel sections and said lower panel section hingedly connected to a lower end of each of said side panel sections, the hinged connections between panel sections configured so that pivoting one of said panel sections about a hinged connection automatically moves all of the panel sections from a folded state in which the panel sections are substantially flat against said frame to an extended state in which said panel sections project outward from said perimeter;

a hinge arrangement at one of said side sections of said frame, said hinge arrangement attachable to the rear of the vehicle; and a latch arrangement at the other of said side sections of said frame, said latch arrangement configured to releasably lock said frame to the rear of the vehicle.

12. The drag reducing apparatus of claim 11, wherein said hinge arrangement includes at least two extension hinges, each extension hinge including:
a fixed hinge attachable to the vehicle;
a fixed plate extending from said hinge;
a moving hinge attached to said frame; and
a moving plate extending from said movable hinge and slidably connected to said fixed plate.

13. The drag reducing apparatus of claim 11, wherein said hinge arrangement includes at least two hinge assemblies, each hinge assembly including:
a fixed hinge having a mounting plate configured to be attached to the rear of the vehicle with said fixed hinge offset forward from the rear of the vehicle along the side of the vehicle;
a moving hinge attached to said frame; and
a plate pivotably connected between said fixed hinge and said moving hinge, said plate sized to span said offset when said frame is locked to the rear of the vehicle.

14. The drag reducing apparatus of claim 13, wherein:
said frame includes a beam extending along said one of said side sections of said frame;
said moving hinge includes a pivot rod pivotably connected to said plate; and
said hinge arrangement includes at a pivot rod mount connected to said beam and supporting said pivot rod at least at opposite ends of said beam.

15. The drag reducing apparatus of claim 14, in which the vehicle includes at least one door at the rear of the vehicle supported by hinges, wherein said pivot rod mounts are sized to support said plate of each hinge assembly in a position that does not interfere with the door hinges of the vehicle.

16. The drag reducing apparatus of claim 14, further including a pivot rod mount connected to said beam between each of said at least two hinge assemblies.

17. A drag reducing apparatus for a vehicle, comprising:
a frame having a perimeter and opposite side sections connectable to the rear of the vehicle, at least one of said side sections being releasably connectable to the vehicle;
an upper panel section, a lower panel section and opposite side panel sections, each of said panel sections hingedly connected around said perimeter of said frame, said upper panel section hingedly connected to an upper end of each of said side panel sections and said lower panel section hingedly connected to a lower end of each of said side panel sections, the hinged connections between panel sections configured so that pivoting one of said panel sections about a hinged connection automatically moves all of the panel sections from a folded state in which the panel sections are substantially flat against said frame to an extended state in which said panel sections project outward from said perimeter; and said frame, said upper panel section and said lower panel section include a center hinge arrangement configured to permit the releasably connected one of said side sections to be pivoted about said center hinge arrangement onto the other of said opposite side sections when said panel sections are in said folded state.

18. A drag reducing apparatus for a vehicle, comprising:
an upper panel section, a lower panel section and opposite side panel sections, each of said panel sections hingedly connectable to the rear of the vehicle, said upper panel section hingedly connected to an upper end of each of said side panel sections and said lower panel section hingedly connected to a lower end of each of said side panel sections, the hinged connections between panel sections configured so that pivoting one of said panel sections about a hinged connection automatically moves all of the panel sections from a folded state in which the panel sections are substantially flat against said frame to an extended state in which said panel sections project outward from said perimeter, wherein the hinged connections between panel sections include a removable fastener strip for removably connecting said panel sections.

19. The drag reducing apparatus of claim 18, wherein said removable fastener strip includes a hook-and-loop fastener.

20. The drag reducing apparatus for a vehicle of claim 1, further comprising:
a lower tether sheet connected between the rear of the vehicle and a free edge of said lower panel section, said lower tether sheet arranged to fold with said lower panel section in said folded state and to define a subtended angle with said lower panel section in said extended state.

21. The drag reducing apparatus of claim 20, wherein the hinged connections between panel sections are configured so that each of said panel sections is oriented at an angle of about 15 degrees relative to a perpendicular plane extending from the rear of the vehicle in said extended state.

22. The drag reducing apparatus of claim 21, wherein said subtended angle is about 30 degrees.

23. The drag reducing apparatus of claim 20, wherein the hinged connection between each of said panel sections and the rear of the vehicle includes a sliding interlocking interface.

24. The drag reducing apparatus of claim 20, further comprising an upper tether sheet connected between the rear of the vehicle and said upper panel section, and side tether sheets connected between the rear of the vehicle and each of said side panel sections.

25. The drag reducing apparatus of claim 24, wherein said upper and side tether sheets are formed of a mesh material.

26. The drag reducing apparatus of claim 20, wherein said lower tether sheet is formed of a material adapted to shed water or debris falling thereon.

27. The drag reducing apparatus of claim 20, wherein said lower tether sheet is connected to the rear of the vehicle with a sliding interlocking interface.

28. The drag reducing apparatus of claim 27, further comprising an upper tether sheet connected between the rear of the vehicle and said upper panel section with a sliding interlocking interface, and side tether sheets connected between the rear of the vehicle and each of said side panel sections with a sliding interlocking interface.

29. The drag reducing apparatus of claim 28, further comprising a frame having a perimeter connectable to the rear of the vehicle, wherein said panel sections and said tether sheets are hingedly connected to said frame.

30. The drag reducing apparatus of claim 29, wherein said frame includes an interior frame structure offset interiorly from said perimeter, said interior frame structure including said sliding interlocking interface for said lower, upper and side tether sheets.

31. The drag reducing apparatus of claim 30, wherein said frame further includes plates spanning said perimeter and said interior frame structure.

* * * * *

UNITED STATES PATENT AND TRADEMARK OFFICE
CERTIFICATE OF CORRECTION

| | | |
|---|---|---|
| PATENT NO. | : 7,854,468 B2 | Page 1 of 1 |
| APPLICATION NO. | : 12/368614 | |
| DATED | : December 21, 2010 | |
| INVENTOR(S) | : John Vogel, Lee Telnack and James R. Tuerk | |

It is certified that error appears in the above-identified patent and that said Letters Patent is hereby corrected as shown below:

Title page, item [73] should read as follows:

Assignee:  Aero Industries, Inc., Indianapolis, IN

Aero Volution, Olympia, WA

Signed and Sealed this
Nineteenth Day of April, 2011

David J. Kappos
*Director of the United States Patent and Trademark Office*